(12) United States Patent
Hsu-Hoffman et al.

(10) Patent No.: US 9,691,298 B1
(45) Date of Patent: Jun. 27, 2017

(54) INTERACTIVE DRIVER DEVELOPMENT

(71) Applicant: Allstate Insurance Company, Northbrook, IL (US)

(72) Inventors: Chienlan Hsu-Hoffman, Palo Alto, CA (US); Gibbs Evan, Daly City, CA (US); Alicia Dornadic, Belmont, CA (US); Andrew L. Carbery, Bartlett, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 13/826,429

(22) Filed: Mar. 14, 2013

(51) Int. Cl.
G09B 9/04 (2006.01)
G09B 19/16 (2006.01)

(52) U.S. Cl.
CPC .................................. G09B 19/167 (2013.01)

(58) Field of Classification Search
CPC .... G09B 19/167; G09B 9/05; A63F 2009/246
USPC .................... 434/62–66, 69; 463/6
See application file for complete search history.

(56) References Cited

U.S. PATENT DOCUMENTS

| | | | |
|---|---|---|---|
| 7,269,539 B2 | 9/2007 | Wang | |
| 7,349,830 B2 | 3/2008 | Gilbert et al. | |
| 8,425,289 B2 | 4/2013 | Beggs | |
| 2002/0090985 A1 | 7/2002 | Tochner et al. | |
| 2008/0022211 A1 | 1/2008 | Jones et al. | |
| 2008/0081694 A1 | 4/2008 | Hong et al. | |
| 2008/0280684 A1 | 11/2008 | McBride et al. | |
| 2010/0160013 A1* | 6/2010 | Sanders | 463/6 |
| 2011/0258044 A1* | 10/2011 | Kargupta | 705/14.49 |
| 2012/0053805 A1 | 3/2012 | Dantu | |
| 2012/0100509 A1 | 4/2012 | Gunderson et al. | |
| 2012/0135382 A1 | 5/2012 | Winston et al. | |
| 2012/0215375 A1* | 8/2012 | Chang | 701/1 |
| 2012/0221216 A1 | 8/2012 | Chauncey et al. | |
| 2013/0017891 A1* | 1/2013 | Romero | 463/43 |
| 2013/0141249 A1* | 6/2013 | Pearlman et al. | 340/870.03 |
| 2013/0316311 A1 | 11/2013 | England | |

(Continued)

FOREIGN PATENT DOCUMENTS

WO    WO 0158548 A1 *   8/2001

OTHER PUBLICATIONS

"Apps for Vehicles Challenge: Final Round (/)," http://vehicles.challenge.gov/submissions/13988-green-button-gamer-driver-challenge?sso=3f2c998e9f665c6c7266ec2622537b2e5c5c934fbd965ede16c8b6710a93932b8f662e0f82f67b24e7e9f07d13f66998376c. (last retrieved Jul. 25, 2013).

(Continued)

Primary Examiner — Andrew Iwamaye
Assistant Examiner — Jerry-Daryl Fletcher
(74) Attorney, Agent, or Firm — Banner & Witcoff, Ltd.

(57) ABSTRACT

Methods, computer-readable media, software, and apparatuses provide an interactive application, such as a video game, that presents gaming and driving challenges to facilitate improvement of driving skills and development of safe driving behavior. Drive data may be collected while a user is driving a vehicle and the drive data may be used to define a graphically simulated virtual world. A drive score may also be calculated based on the drive data. Portions of the graphically simulated virtual world may be unlocked based on the drive score. Also, attributes of a character within the graphically simulated virtual world may be modified based on the drive score.

20 Claims, 14 Drawing Sheets

(56) References Cited

U.S. PATENT DOCUMENTS

2014/0125678 A1    5/2014    Wang et al.

OTHER PUBLICATIONS

Rick Broida, "Road Wars app turns safe driving into a game," CNET Reviews, Nov. 15, 2013, http://reviews.cnet.com/8301-19512_7-57612558-233/road-wars-app-turns-safe-driving-into-a-game/ (last visited Nov. 25, 2013).
Office Action issued on Apr. 17, 2015 in related U.S. Appl. No. 13/826,890.
Non Final Office Action issued on Jul. 1, 2015 U.S. Appl. No. 14/038,982.
US Non Final Office Action for US Appl. No. 13/826,890 issued Oct. 2, 2014.
Non-Final Office Action issued on Oct. 7, 2015 in U.S. Appl. No. 13/826,890.
Feb. 2, 2016—Final Office Action—U.S. Appl. No. 14/038,982.
Apr. 5, 2016—(US) Office Action—U.S. Appl. No. 13/826,890.
Aug. 23, 2016—(US) Notice of Allowance—U.S. Appl. No. 13/826,890.
Aug. 26, 2016—(US) Non-Final Office Action—U.S. Appl. No. 14/038,982.

\* cited by examiner

Welcome to DriveQuest!

Name: _____

Birthday: _____

Email: _____

Phone: _____

.
.
.

Policy #: _____

Welcome to DriveQuest!

Choose Character:

Name of Character: Questor3

INTERACTIVE DRIVER DEVELOPMENT

FIELD OF ART

Aspects of the disclosure generally relate to computer systems and computer software. More particularly, aspects of this disclosure provide interactive educational software; methods for managing a user experience, capturing driving characteristics, and administering interactive software based on user actions and driving characteristics; methods of playing interactive computer software; and systems for interfacing user interfaces with computing devices.

BACKGROUND

Car accidents are a common cause of injury and damage, and the costs resulting from car accidents can be significant. The frequency of car accidents is especially high for young and/or novice drivers. There is a demand to reduce the number of accidents among this group of drivers. In the United States, many states require mandatory training for new drivers. This training may include attending classes and/or taking a driving course with a certified instructor. However, some people may still need/want to improve their driving beyond this training. Indeed, even those who have had their driver's license for a considerable time may want to improve and/or receive feedback in regards to their driving skills.

Accordingly, new systems, devices, methodologies, and software are desired to incentive or encourage novice drivers, such as teenagers, and others to continue to improve their driving skills and to focus on the road and its surroundings while driving so as to reduce (or prevent) accidents.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing an interactive software application, such as computer-based education software, that presents gaming and driving challenges to promote safe driving.

Aspects of this disclosure provide computer readable media storing computer-executable instructions that, when executed, configure a computing device to receive drive data at a safe driving software application, said drive data generated based on one or more driving maneuvers (e.g., accelerating, decelerating, turning, braking, swerving, changing lanes, parking, and other driving actions) performed by a user while driving a vehicle in a real-world, and alter a graphically simulated virtual world based on the drive data. The computer-executable instructions may further cause the computing device to compute a drive score based on the drive data. A drive score may represent the user's driving performance in relation to driving standards and/or may represent driving conditions (e.g., visibility, weather conditions, traffic conditions, road conditions, etc.) in which the driving took place. Also, the computer-executable instructions may configure the computing device to, for example, unlock a portion of the graphically simulated virtual world based on the drive score. Additionally, or alternatively, the computer-executable instructions may configure the computing device to, for example, modify attributes of a character within the graphically simulated virtual world based on the drive score. Aspects of the disclosure also provide the computing device or apparatus including the computer readable media storing such computer-executable instructions. The computing device or apparatus may be a smartphone, tablet, laptop, vehicle's computing device (including a vehicle's in-dash display screen), etc.

Aspects of the disclosure further provide a method of administering computer-based education software. This method may include collecting drive data while a user is driving a vehicle in a real world. Collecting drive data may include detecting a brake event and/or turn event using a 3-axis accelerometer, gyroscope, GPS, or other device. Further, the method may include defining a graphically simulated virtual world based on the drive data. The method may also include computing a drive score based on the drive data. In some cases, the method may include unlocking a portion of the graphically simulated virtual world based on the drive score. Additionally, or alternatively, the method may include determining lighting conditions, traffic conditions, weather conditions, etc. in which the user is driving and modifying the graphically simulated virtual world accordingly. For example, if the user is driving during the day, the lighting in the virtual world may be brighter. Or, if the user is driving in snow, snow may appear in the virtual world and a character may appear to shake from the cold.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited in the accompanying figures in which like reference numerals indicate similar elements and in which.

DETAILED DESCRIPTION

In accordance with various aspects of the disclosure, methods, computer-readable media, software, and apparatuses are disclosed that provide a safe driver application for drivers to interact with. The safe driver application may include computer-based education software that users interact with by driving and selecting user inputs (e.g., pressing buttons, touching a screen, etc.). The safe driver application may be designed for implementation on a user device, such as a smartphone, tablet, laptop, etc., that permits a user with easy and flexible (e.g., portable) access to the application. The safe driver application may provide a source of entertainment for users as they improve (or attempt to improve) their driving skills and develop safe driving behavior (e.g., focus on the road while driving). Thus, the safe driver application may be referred to herein as computer based education software, educational software, video game, and/or as a serious game. A user's driving performance may influence the user's experience and/or performance/progression within the safe driver application. For example, a user may obtain rewards for good driving behavior that help them to advance. Therefore, users interested in playing and progressing through the safe driver software may be motivated to improve their driving skills and/or drive safely. In the process, the safe driver software may help users develop safe driving habits.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made. Furthermore, the disclosures of each of the following patent applications are incorporated by reference herein in their entirety: U.S. patent application Ser. No. 13/216,849, filed Aug. 24, 2011, entitled "In Vehicle Driver Feedback Device;" and the concurrently-filed U.S. patent application Ser. No. 13/826,890 entitled "Pre-License Development Tool" in the law offices of Banner & Witcoff, Ltd.

Figure 1:
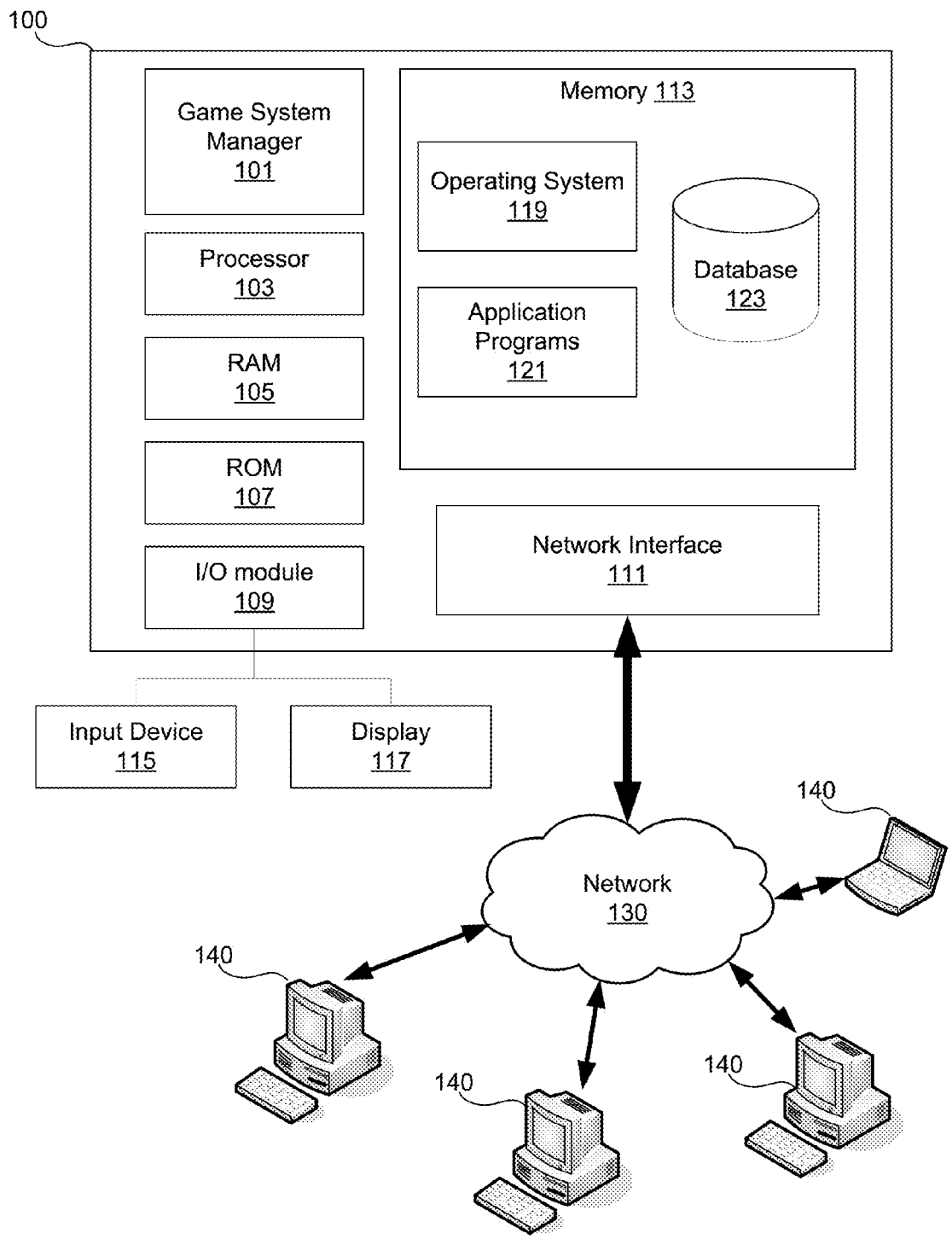
FIG. 1 is a block diagram of an example computing device that may be used according to an illustrative embodiment of the present disclosure.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a game system manager 101 for performing methods described herein. The game system manager 101 may be implemented with a processor and memory. Throughout this disclosure, the game system manager 101 may be used to reference a combination of the processor and memory storing instructions executed by that processor and/or the instructions themselves. The processor of the game system manager 101 may operate in addition to or in conjunction with another processor 103 of the computing device 100. Both the game system manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the game, such as rules of the game and graphics of the game, described in further detail below. On a client-side computing device 100, the input device 115 may be operated by users to interact with the game, including performing a challenge within the game, moving a character, navigating through levels of the game, reviewing scores of the game, etc., as described in further detail below. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

The computing device 100 may be a mobile device (e.g., a smartphone), and thus, may also include various other components, such as a battery, speaker, and antennas (not shown).

Figure 2:
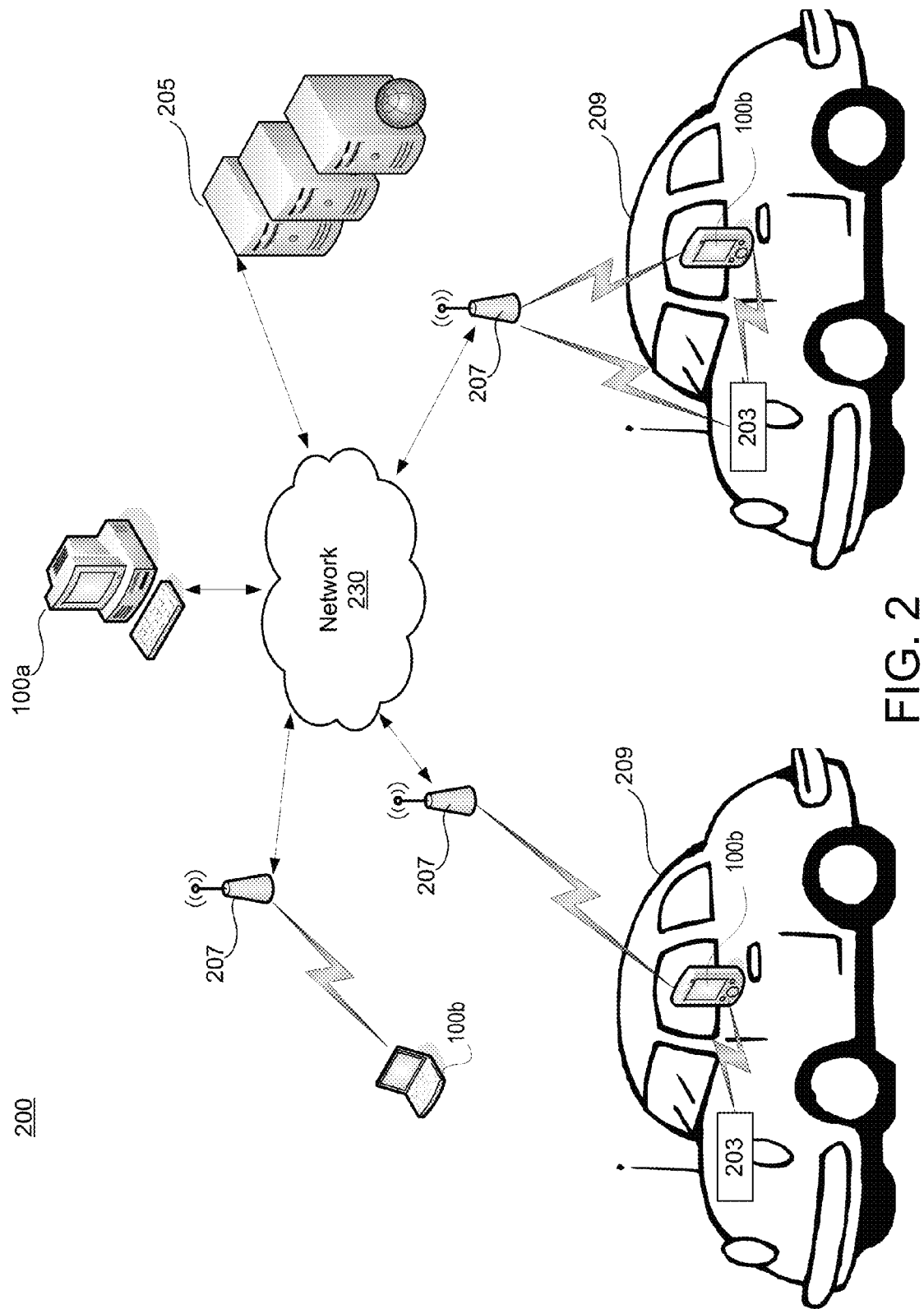
FIG. 2 illustrates an example network environment for implementing methods according to the present disclosure.

The safe driver application disclosed herein may be implemented on a computing device 100 used in various network environments. FIG. 2 illustrates an example network environment 200 for implementing methods according to the present disclosure. As shown in FIG. 2, the network environment 200 may include a network 201 configured to connect one or more server-side computing devices 100a with one or more client-side computing devices 100b. The network environment 200 of FIG. 2 may also include one or more vehicle computing devices 203, application servers 205, and access points 207. The network 201 may be any type of network, e.g., the network 130 described above. In particular, the network 201 may include a cellular network and its components, such as base stations, cell towers, etc.

Referring to FIG. 2, the server-side computing device 100a may be configured to generate, edit, manage, and deliver the safe driver application. The safe driver application may be downloaded, installed, and executed on one or more of the client-side computing devices 100b. In some examples, the server-side computing device 100a may execute the safe driver application in tandem with a client-side computing device 100b. The server-side computing device 100a may, for example, render graphics and webpages which are then streamed to the client-side device 100b which may be used to supply user inputs so that the user may interact with the safe driver application. As shown in FIG. 2, the client-side computing device 100b may be a portable user device, such as a smartphone, tablet, laptop, etc., that a user may take with them into a vehicle 209. Although FIG. 2 shows the vehicles 209 as being cars, vehicles 209 may include motorcycles, trucks, buses, boats, etc.

While a client-side computing device 100b is inside or near a vehicle 209, it may communicate with the vehicle's computing device 203. In some examples, the vehicle's computing device 203 may include the vehicle's on-board diagnostic (OBD) system. The client-side computing device 100b may communicate with the vehicle's computing device 203 via a wired connection (e.g., OBD II connector) or a wireless connection (e.g., Bluetooth).

In some embodiments, the safe driver application may be downloaded, installed, and delivered to a vehicle's computing device 203. That is, a vehicle computing device 203 may have similar functionality that a smartphone, tablet, or other client-side computing device 100b may have. A vehicle's computing device 203, therefore, may be used to interact with the safe driver application. In some cases, the vehicle computing device 203 might only operate certain modules of the safe driver application related to driving, such as collecting driving data, computing drive scores, etc., while in other cases all modules of the safe driver application may be implemented using the vehicle's computing device 203. Indeed, even the challenges described herein may be played through the vehicle computing device 203 (with or without an additional client-side computing device 100b), so that the vehicle computing device 203 effectively operates as a client-side computing device 100b. Thus, herein, where features of the safe driver application are described as being performed by a client-side computing device 100b, it should be understood that they may be performed by a vehicle computing device 203.

In some examples, aspects of the disclosure may be implemented by a client-side computing device 100b and a vehicle computing device 203 in tandem. For example, a user may select a key to view a drive tutorial on their client-side computing device 100b (e.g., phone), and then select another key on the vehicle computing device 203 to begin the driving mode in which drive data is collected. Further, either one or both of the client-side computing device 100b or the vehicle computing device 203 may collect driver data during the driving mode and may exchange and/or compare the drive data during or after the drive.

Additionally, FIG. 2 shows that the network environment 200 may include access points 207, which may include cellular network components (e.g., cell towers, base stations, etc.), global positions system components (e.g., antennas, satellites, etc.), and other wireless access components (e.g., routers), for connecting the client-side computing devices 100b and/or vehicle computing devices 203 to the network 201. As such, through the network 200, the client-side computing devices 100b and/or vehicle computing devices 203 may communicate with application servers 205 to obtain various information, such as the time of day, weather information, traffic information, position information, software updates, etc.

In some embodiments, one or more of the application servers 205 may be configured to provide a service that receives drive data from users and converts the drive data into rewards that may be used to play various video games. For example, a user may provide his/her drive data to an application server 205, which may analyze the drive data and determine that the user is eligible for rewards that can be used in one or more video games. The application server 205 may include software for applying rules to the drive data to determine what rewards are deserved/earned. The rewards given to the user may depend on what game the user wants to play. For some video games, the user may be rewarded with points that allow them to achieve a higher score or obtain objects/items within the game. For other video games, the user may be rewarded with a bonus character, bonus level, or bonus object/item. As such, users may use the safe driver application to collect and provide drive data and/or driving assessment information from client-side computing devices 100b, so that users may obtain rewards for use in their favorite video games.

To implement such embodiments, a database may be included within the application server 205 to store user identification information in association with the received drive data and/or driving assessment information, (including driving scores). The user may have to complete a number of drives in order to obtain rewards for the video game he/she desires to play. Therefore, the application server 205 may be configured to maintain records of users' past accomplishments so that users can work towards their rewards. The application server 205, including its records, may be accessible by third-party video game vendors who may access the application server 205 to determine which users are eligible for which bonus features and/or rewards. Users motivated to receive rewards to help them advance in or supplement their favorite video games may be motivated to use the safe driver application, which in turn may motivate users to improve their driving skills and practice safe driving behavior.

Further, in some embodiments, one or more of the application servers 205 may be configured to provide a social networking service or facilitate social networking on other social networks (e.g., Facebook, Twitter, etc.). An application server 205 may be configured to receive and send an email, text message (e.g., SMS message), social network post (e.g., "like" on facebook), or other communication, so that different users executing the safe driver application on their respective client-side computing devices 100b may communicate with each other. For example, a safe driver application executing on one client-side computing device 100b may send a message to a particular application server 205 that may analyze the message to identify another client-side computing device 100b and send the message to that other device. The application server 205 may identify the client-side computing devices 100b by the names of characters created using the safe driver application. More particularly, the application server 205 may include a database associating character names (of characters created using the safe driver application) with client-side computing devices 100b (or identifiers associated with client-side computing devices, such as email addresses, telephone numbers, etc.). As such, different users of the safe driver application may enjoy a social network experience in which their characters appear to converse with one another. In some examples, the application server 205 may allow the characters to exchange rewards, trade items, and/or compete in challenges against each other. Still, in some examples, the social networking service provided by the application server 205 may be a webpage (or website) with information, such as driving scores, character status, game rewards, etc., associated with the different characters created by users of the safe driver application.

Figure 3:
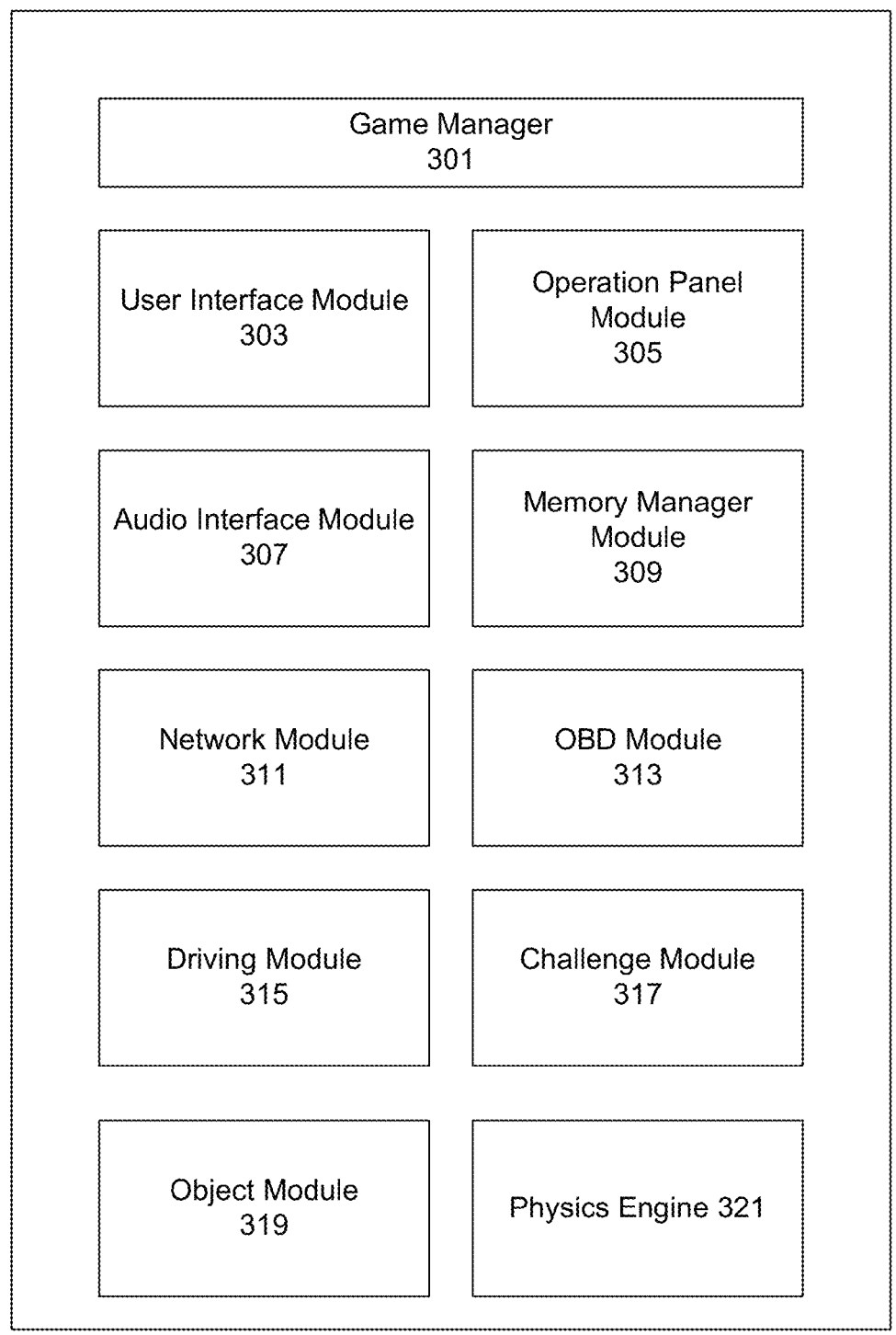
FIG. 3 illustrates a block architecture diagram of software modules that may be used to implement various features described herein.

FIG. 3 illustrates a block diagram of a safe driver application 300. Each block in FIG. 3 illustrates a logical software module, which may include one or more functions, that performs an action, provides a capability or feature, implements an object, or performs some other aspect of the safe driver application 300. When the safe driver application 300 executes on a data processing system, such as a client-side computing device 100b, the modules may operate collectively to provide a video game experience to a user.

Different video game experiences may be desired by drivers of different age groups, gender, ethnicity, demographics, etc. Thus, it is contemplated that the safe driver application 300 may provide a variety of video game experiences.

One such video game experience, referred to as "DriveQuest," may involve a character (e.g., a knight, wizard, or other hero) travelling to different areas within a graphically simulated virtual world. A map may serve as the gateway to this virtual world. Users may move their character throughout the map and select various areas of the map. When an area of the map is selected, the character may be placed into a corresponding area of the virtual world. There, the character may face a specific challenge (or task) for a specific purpose. For example, the character may enter into a jousting competition to hone his skills, build up courage, and/or earn rewards that may help him in subsequent challenges. In one such subsequent challenge, the character may have to fight or defend himself from a forest creature to rescue a princess. In the "DriveQuest" game, characters may collect coins, which can be used to purchase items, such as swords and shields, that may also assist in the challenges. Users desiring to obtain such rewards may be motivated to continue playing the "DriveQuest" game. However, in "DriveQuest," a user cannot simply advance based on their gaming skills. "DriveQuest" may require users to drive to advance within the game. For example, a certain driving score based on a user's driving performance may be required to access certain challenges. As users drive they may open up new challenges, and as they complete challenges, they may open up new levels, which may require them to drive again to reach the challenges of the new levels. Accordingly, "DriveQuest" may facilitate the improvement of driving skills and development of safe driving behavior.

Another contemplated video game experience, referred to as "TinyTraveler," may involve nurturing and protecting a character (e.g., a traveler) within a graphically simulated virtual world. In "TinyTraveler," users may have to interact with the traveler by providing various user inputs. For example, users may have to press the screen of a client-side computing device 100b to feed the traveler so that the traveler stays healthy. Meanwhile, attributes of the graphically simulated virtual world may change based on conditions of the user's drive. For example, if the user drives at night, the graphically simulated virtual world may display a night time scene (e.g., darker screen). Or, if the user drives in the rain, the graphically simulated virtual world may display a rainy scene. Further, some attributes of the traveler may change according to the user's driving performance. For example, if a user drives at night, brakes too hard, or turns with too much g-force, the traveler may become scared. As a result, the traveler may appear to shake or hide from the user. To continue the game, user may have to provide direct user inputs to console the traveler. For example, users may have to swipe the screen of a client-side computing device 100b to pet the traveler so that the traveler calms down. Or, users may have to drag objects onto the screen to lure the traveler out of hiding. In some cases, users may have to rely on their driving performance to aid the traveler. For example, a user may have to drive slowly or during the day to get the traveler to return from hiding. Notably, different users of "TinyTraveler" may receive different user experiences based on their driving behavior. For example, the traveler of a user who does not explore new driving routes may stay in the same place within the virtual world, whereas a user who takes different driving routes and visits different places may allow their traveler to move to different places within the virtual world.

In "TinyTraveler," positive driving behavior may also result in rewards that can be used during the game. For example, if the user achieves a certain driving score, he/she may receive a cake, which can be fed to the traveler. In some embodiments of "TinyTraveler," as the user advances in the game, the user may help the traveler to grow or find its way home. Users desiring to continue to protect, nurture, and/or assist the traveler may be motivated to continue to play "TinyTraveler." Accordingly, "TinyTraveler" may facilitate the improvement of driving skills and development of safe driving behavior.

The modules illustrated in FIG. 3 are examples, and additional or different modules may be used depending on the version and/or video game being implemented. The same, additional, or different modules may be executed in tandem on a server or server-side computing device 100a with which the client-side computing device 100b may be connected. Different client-side computing devices 110b may run on different operating systems, and therefore, the safe driver application 300 may be available in different versions for the respective operating systems (e.g., iOS, Android, etc.). Accordingly, certain modules may differ for the different versions.

The safe driver application 300 may include a game manager module 301, which manages the overall operation of the video game and may be the initial module launched when the video game is executed. The safe driver application 300 may also include a graphical user interface module 303 to manage and control the graphics depicted on a display of the client-side computing device 100b. The graphical user interface module 303 may also handle user inputs via a screen (e.g., a touch-screen). For example, the graphical user interface module 303 may include one or more functions for detecting and handling screen swipe events, screen touch events, etc. The safe driver application 300 may also include an operation panel interface 305, which may detect and handle inputs made via an operation panel of the client-side computing device 100b, such as a keyboard, keypad, buttons, etc. Similarly, the safe driver application 300 may include an audio interface 307 for outputting audio through a speaker of the client-side computing device 100b and/or inputting audio through a microphone of the client-side computing device 100b. The graphical user interface module 303, operation panel interface module 305, and/or audio interface module 307 may collaborate to detect and handle simultaneous inputs, e.g., when a user speaks and presses a button or screen at the same time.

The memory manager module 309 may manage memory while the safe driver application is running. This may include allocating RAM to the various modules. The memory manager module 309 may also facilitate the storage of levels, characters, character statistics, gaming (e.g., challenge) scores, algorithms for computing gaming (e.g., challenge) scores, driving scores, algorithms for computing driving scores, driver statistics, rules of the game, etc. The safe driver application 300 may also include a network module 311 configured to communicate via the network 201. More particularly, the network module 311 may manage communications with a provider of the safe driver application 300 (e.g., a server-side computing device 100A) or the application servers 205. The network module 311 may also manage communications with third party servers and databases to, for example, obtain information regarding weather, traffic, time, maps, etc.

The on-board diagnostic (OBD) module 313 may manage communications with a vehicle's on-board diagnostic system. Such communications may include transmitting requests for certain data and/or receiving codes from the on-board diagnostic system. The OBD module 313 may be configured to handle data via wired and/or wireless connections. The safe driver application 300 may also include a driving module 315 configured to read information from a GPS, 3-axis accelerometer, and/or gyroscope of the client-side computing device 100b. Further, the driving module 315 may be configured to use this information to compute a driving score based on one or more algorithms. The safe driver application may include a challenge module 317 as well. The challenge module 317 may be configured to execute a particular challenge. The safe driver application may include a plurality of challenges, and therefore, the challenge module 317 may include a plurality of sub-modules for executing the respective challenges. Each challenge may react to user inputs differently, so each challenge may have its own sub-module within the challenge module 317. For example, touching a screen in one challenge may move a shield, while touching the screen in another challenge may cause a sword to swing. The different sub-modules may share similar event-listeners, and execute different event-handlers.

Additionally, the safe driver application may include an object module 319. The object module may be configured to present each of the objects on the screens described below. Various software modules may operate with one or more classes or objects defined and used in the safe driver application 300. The classes and objects may be defined with reference to an object module 319, and may include portions of executable software code and/or one or more data structures, depending on the object. Each object may be rendered and simulated in the virtual world in accordance with a physics engine 321. Each module depicted in FIG. 3 may communicate directly or indirectly with each other module, e.g., by passing objects, data, parameters, input, and output, etc.

A first class of objects may define characters in the video game. Characters may be defined by various attributes associated with the character, e.g., name, physical appearance, skills, etc. Skills may be defined based on a character's task. For example, a character's skills may include swinging a sword, moving a shield, jumping, ducking, etc.

A second class of objects may define objects in the video game. Objects may be static or movable, but unlike characters, might not be controllable by a user. For example, a horse that a character rides in one challenge may be included in the second class of objects. Another example of an object of the second class may be a target that shatters when hit by a sword during a challenge. Yet another object in the second class of objects may be an arrow that follows a given path unless blocked by another object.

Figures 4A, 4B:
FIGS. 4A-4P show illustrative user interfaces presented by a computer-based education application in accordance with aspects of the present disclosure.
Figure 4C:
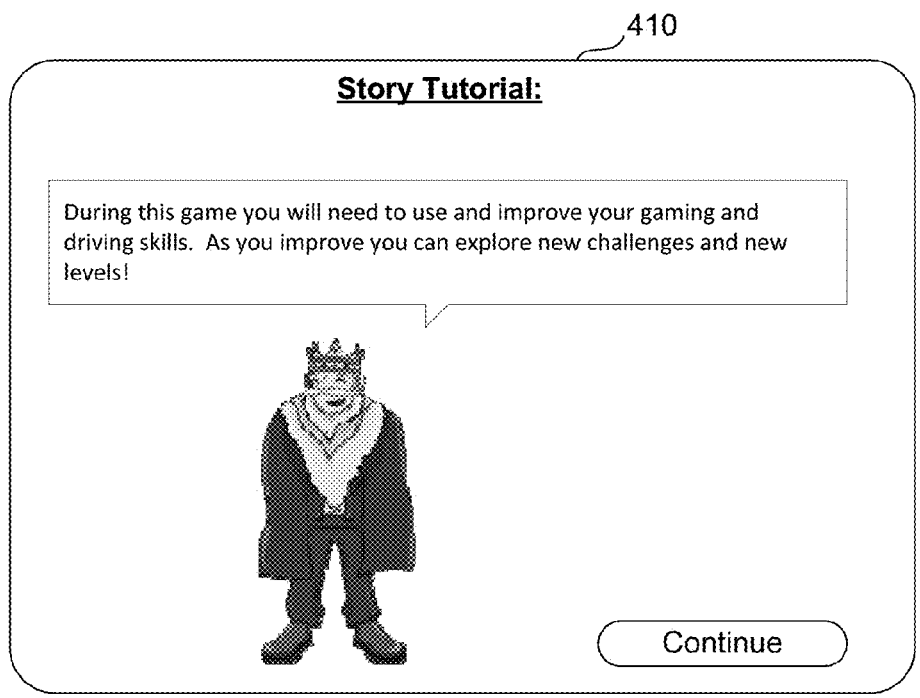
Figure 4D:
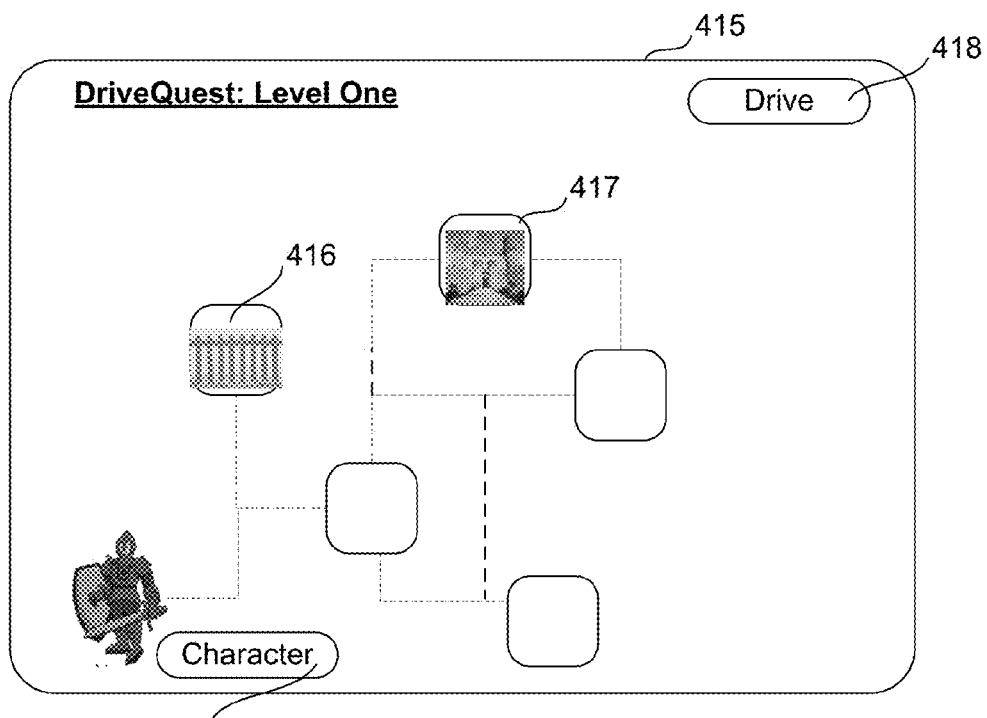
Figure 4E:
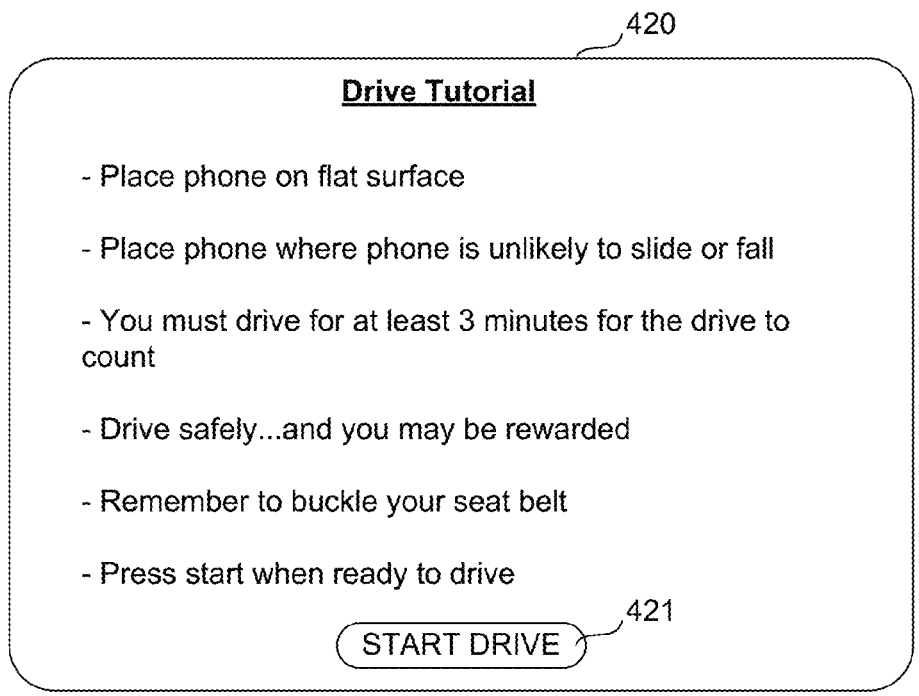
Figure 4F:
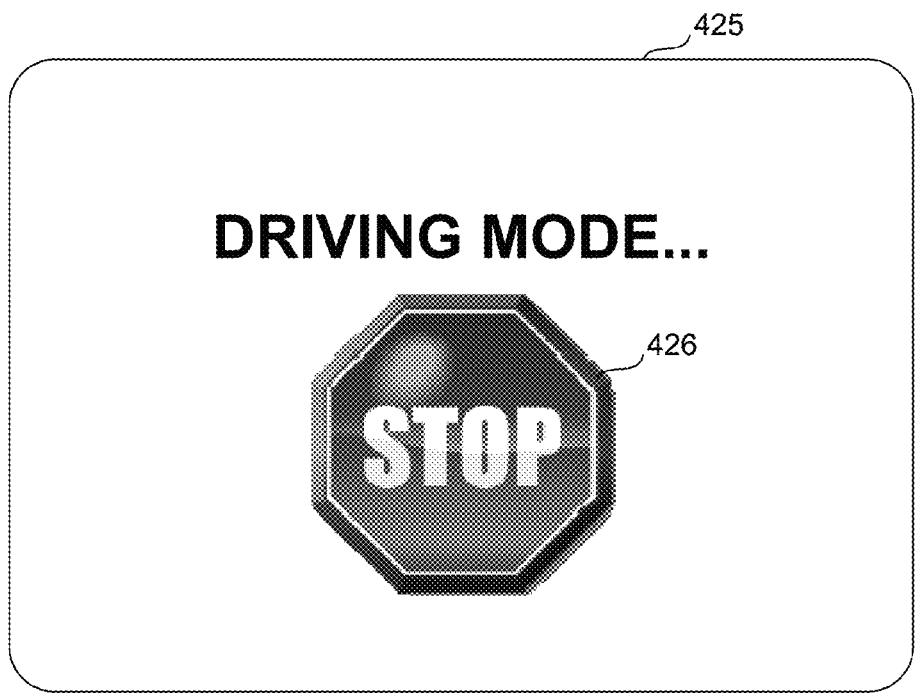
Figure 4G:
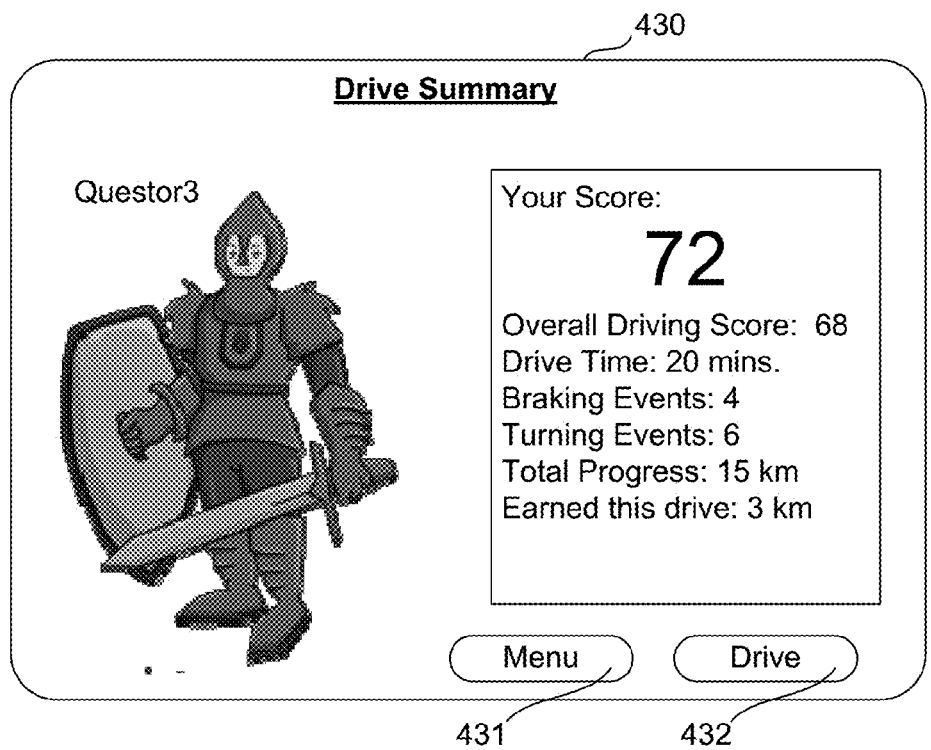
Figure 4H:
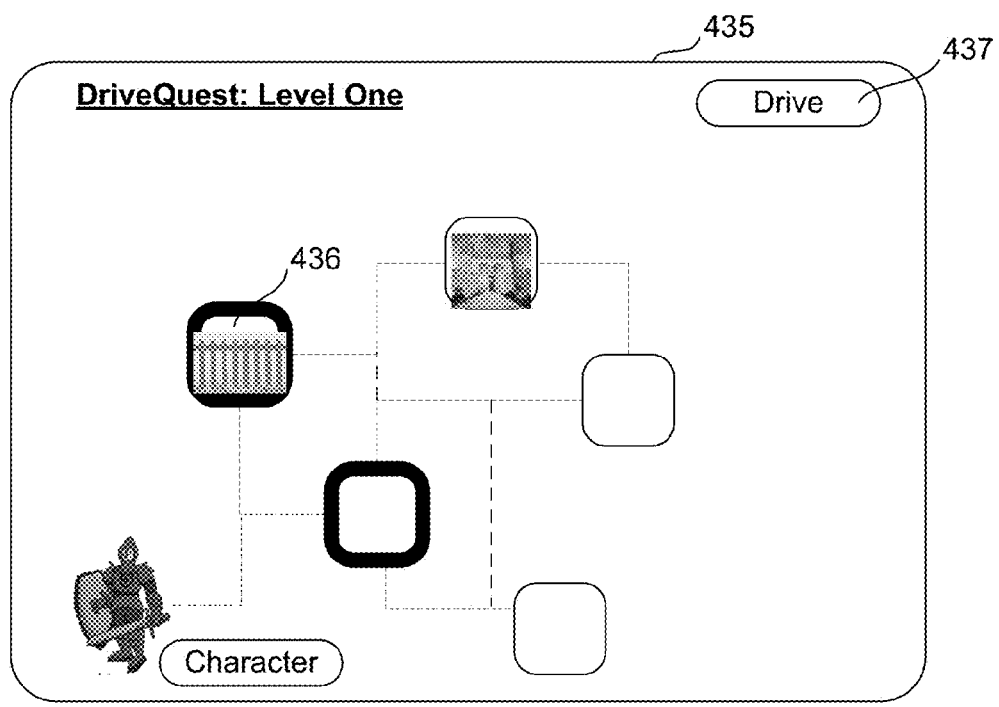
Figure 4I:
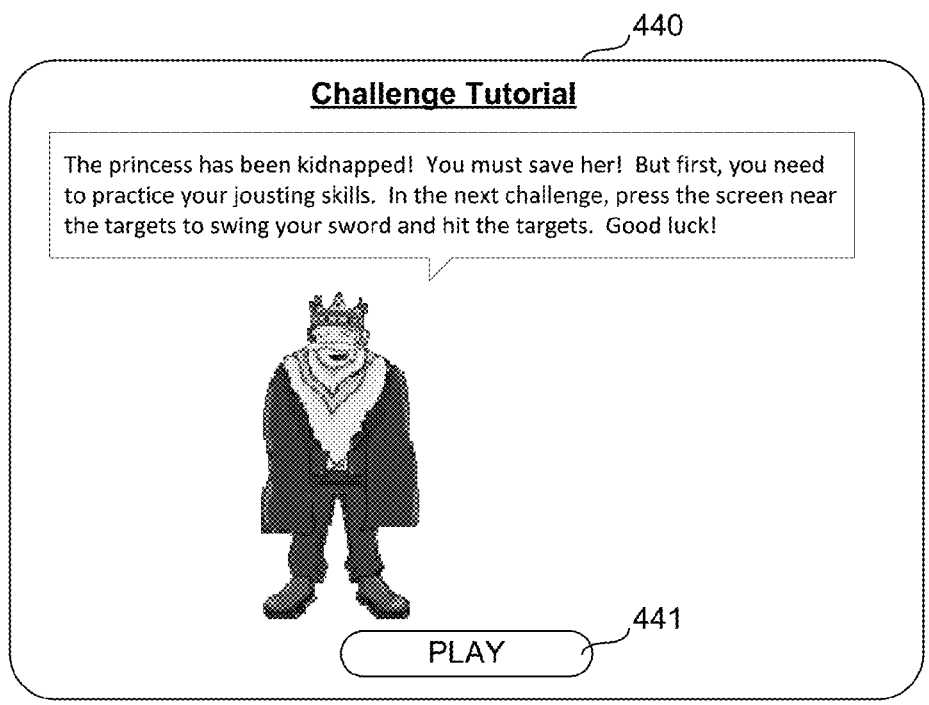
Figure 4J:
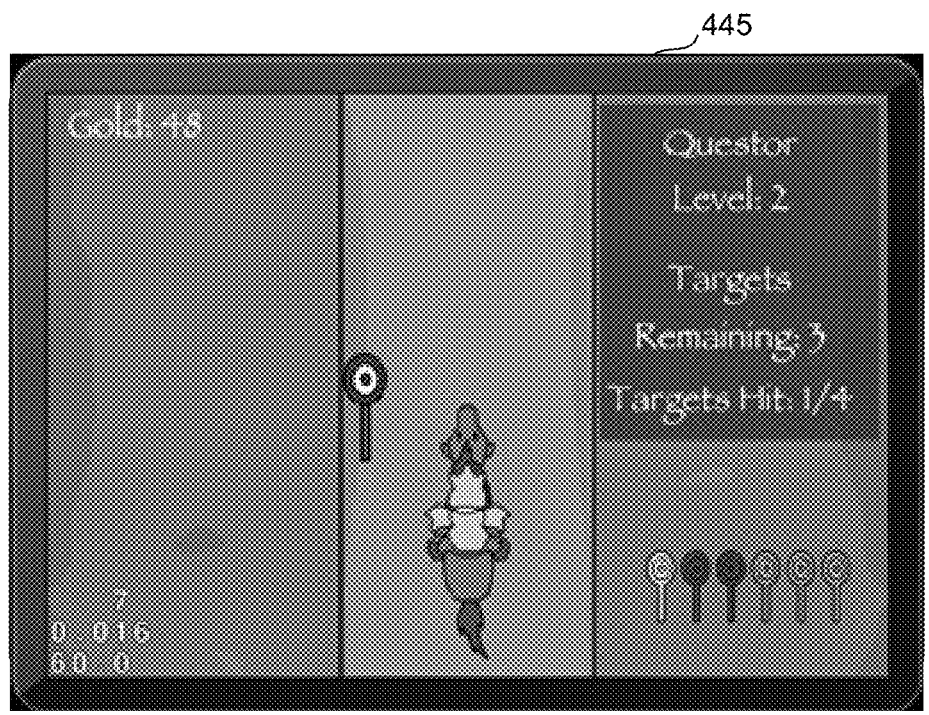
Figure 4K:
Figure 4L:
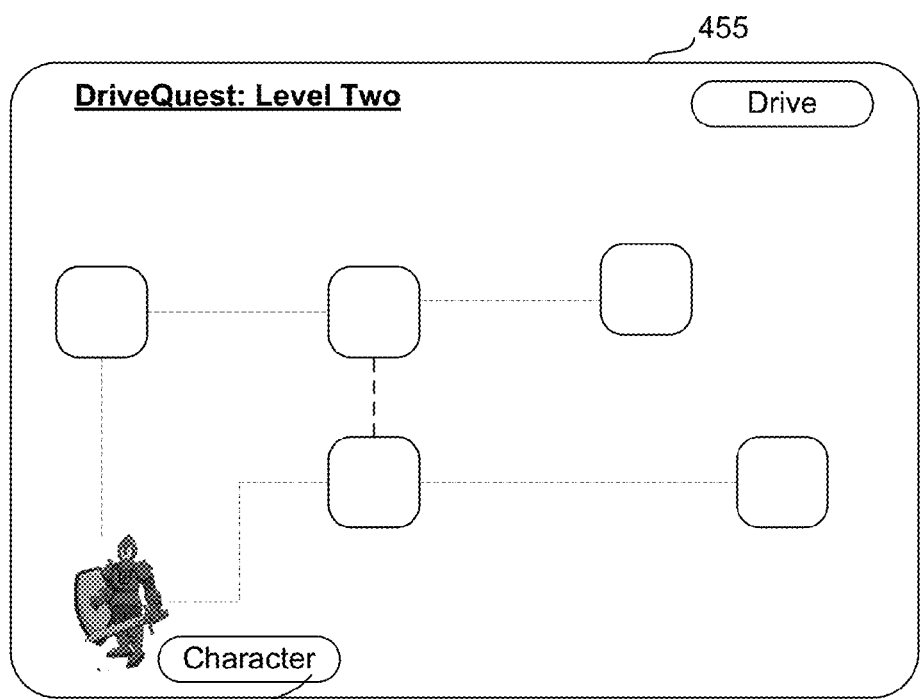
Figure 4M:
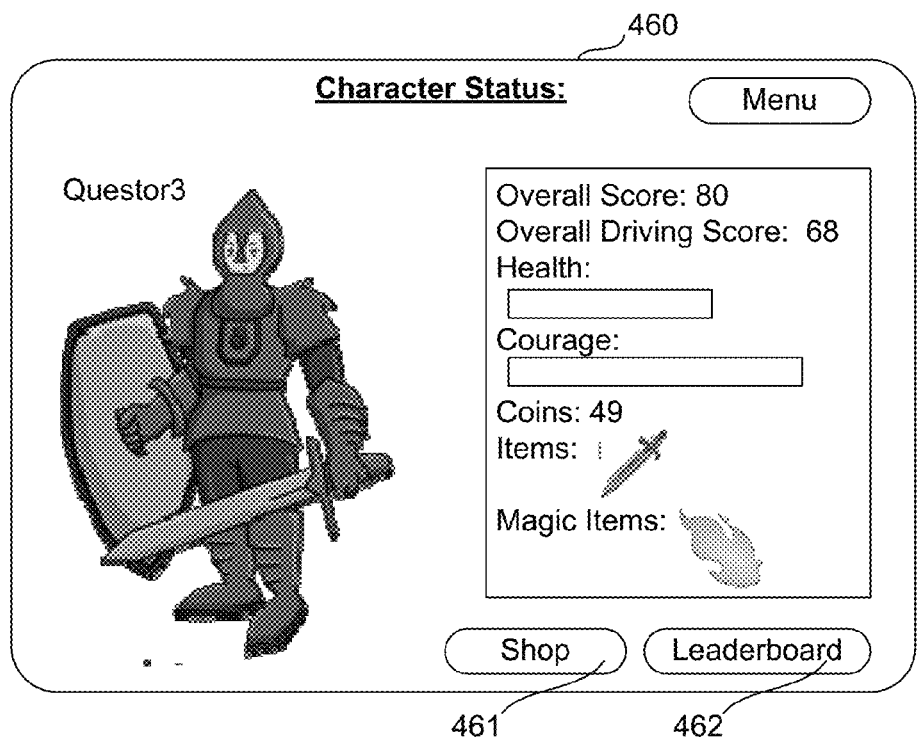
Figure 4N:
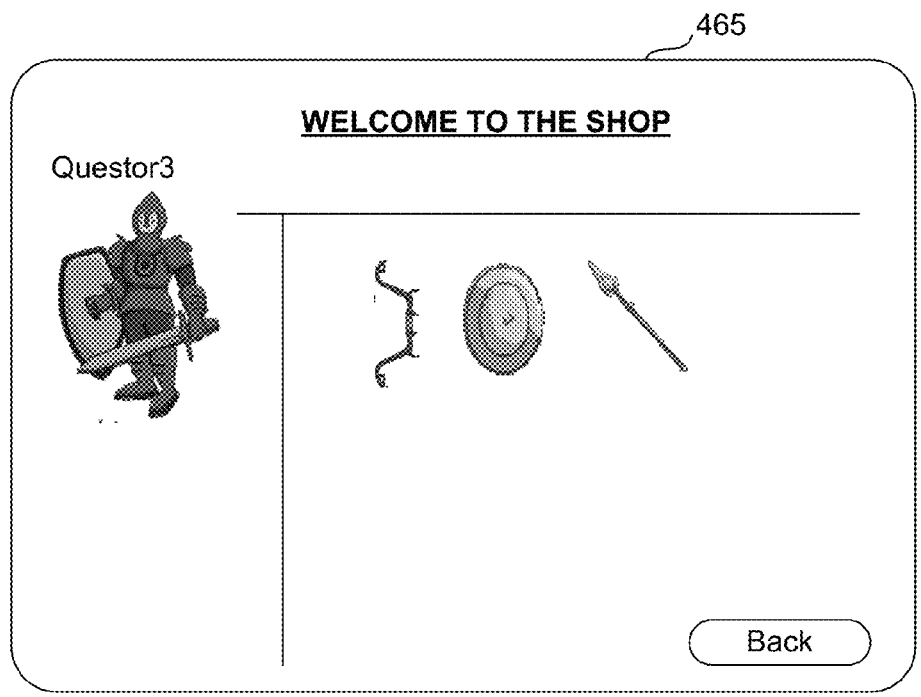
Figure 4O:
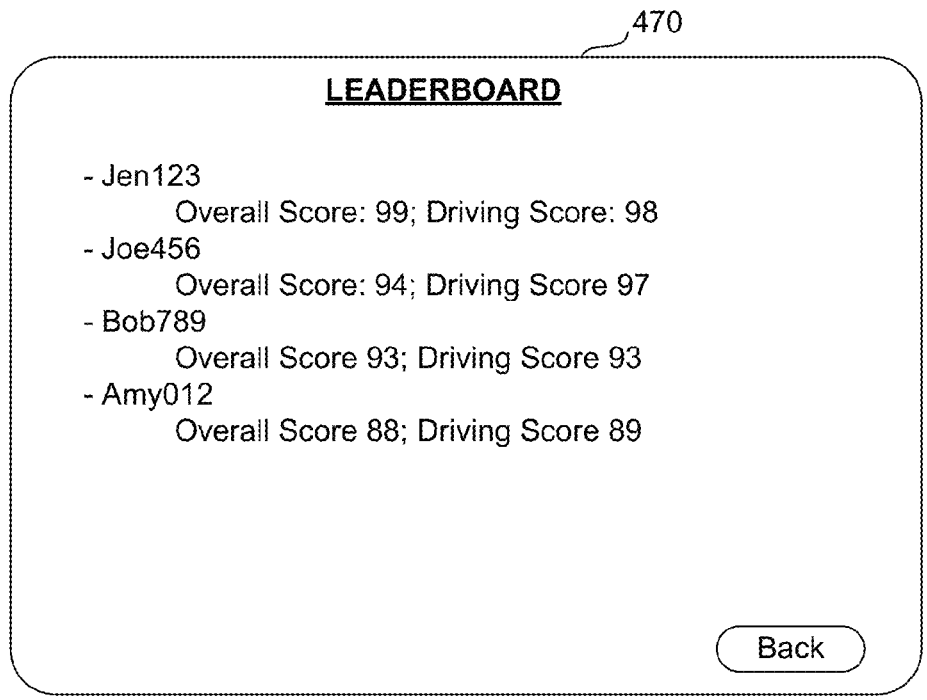
Figure 4P:

FIGS. 4A-4P illustrate various screens displayed by the safe driver application 300. FIG. 4A depicts a user information acquisition screen 400. This screen may be the first screen shown the first time that the user runs the safe driver application. The screen may include a plurality of fields in which a user may enter information. Here, the user may enter their name, date of birth, e-mail address, gender, etc. In some embodiments, the user may also enter an account number (or policy number) of an account (or policy) that a user has established with a corporate entity (such as an insurance company, and in particular an auto insurance company). Users with a policy may receive additional game experiences, such as bonus levels, bonus characters, etc.

After entering user information, the user may continue to a game initiation screen 405 shown in FIG. 4B. In the game initiation screen 405, the user may choose a character and/or a character name. In some embodiments, the user may have the option of designing their character by choosing features. For example, the user may choose from a list of hairstyles, which may then become part of their character.

Once the user chooses a character, a storyline screen 410 may be presented. As illustrated in FIG. 4C, the storyline screen may give a brief overview of the safe driver application in order to introduce the user to the game and its objectives and features. In particular, the storyline screen 410 may explain that the user will have to use and improve his/her gaming and driving skills to unlock new challenges and advance to new levels. For example, in the "Drive-Quest" game, a character (e.g., a king) may appear on the storyline screen 410 to explain to the user that as he/she demonstrates his/her driving skills, new challenges and levels may become available for exploration. In some cases, the overview may be presented as text on the storyline screen 410 and/or an audio recording that is output from speakers of, or coupled to, the computing device 100 running the safe driver application.

After giving the user an overview of the safe driver application, a menu screen 415 may be presented to the user as shown in FIG. 4D. The menu screen 415 may inform the user of the level that he/she is at (e.g., level 1, level 2, etc.) and may include available challenges that the user may accept. In some cases, the user may have to drive before any of the challenges are made available. Accordingly, icons/images associated with unavailable challenges may appear grey or otherwise modified to indicate their unavailability. In addition, to the level information and challenge icons, the menu screen 415 may also include a link to a character statistics screen, which is described in more detail below.

In FIG. 4C, an example menu screen 415 for level one of the "DriveQuest" game is shown. As illustrated, this menu screen 415 may include a map with one or more areas. Each area may be represented by a different image. For example, a first area 416 may include an image of a fence to represent stables, while a second area may include an image of a castle to represent a kingdom. Further, in the menu screen 415 of FIG. 4C, each area on the map may be associated with its own unique challenge that can be accepted by positioning the character in the area. The character's movement may be manually controlled by the user or automatically controlled as a result of a user's driving score described in more detail below. As such, the menu screen 415 may be updated to reflect a position on the map where the user's character is located. As shown, the map may include a number of paths connecting the various areas on the map. Some areas may be farther from the character's starting position than others. Users may be required to drive more times and/or achieve higher driving scores in order to reach farther areas than would be required to reach closer areas. In some cases, the character may have to travel along a preset path and visit areas in a preset order. Still, in some cases, the user may have to complete challenges before the character can be moved to another area. In other cases, however, a user may choose to move on to the next area without accepting a challenge or failing to complete a challenge. In such cases, the character's status (e.g., health, wealth, etc.) may be negatively affected. Similarly, a character's status may be positively affected, if the user completes or attempts to complete a challenge before moving on to another area. Moreover, the safe driver application may incentivize users to drive less frequently by positively affecting their character's status if users follow a prescribed course of action in which a user does not drive until a challenge is completed. In other words, by rewarding users for completing challenges between drives, the safe driver application can encourage users to drive less often. For example, when a user has driven an amount necessary to reach the first area 416, the user may be incentivized to forego further driving until the user attempts to complete or completes the challenge at the first station. By encouraging the user to interact with the challenges between drives, the safe driver application may reduce the amount a user drives.

As shown in FIG. 4D, the menu screen may include a drive link 418, such as a virtual drive button, and a character link 419, which may also be a virtual button. The drive link 418 might only appear on the menu screen when it is the user's turn to drive. For example, when the character has reached a first area 416, the drive link 418 might not be shown, or may be deactivated, in order to incentivize the user to at least attempt the challenge at the first area 416 before driving again.

When the drive link 418 is active and selected by the user, the safe driver application may present a drive tutorial screen 420 as shown in FIG. 4E. The drive tutorial screen 420 may provide instructions to the user for setting their user device so that it operates in a driving mode. Such instructions may include instructing the user to place the phone, with the screen facing up and the top in the forward direction of the vehicle, on a relatively flat surface where it is relatively unlikely to move. In some cases, to ensure accurate drive readings, it may be desirable to situate the user device on a flat surface where it will not move so that the devices' movement is not confused with the vehicle's movement. An example position for the user device may be on the dashboard, a center console, trunk floor, back seat, etc. The drive tutorial screen 420 may assist the user in determining whether the user device is sufficiently flat. That is, the drive tutorial screen 420 may depict a tool for showing whether the user device is flat to assist the user in orienting the user device. The drive tutorial screen 420 may also include a calibration tool for users to establish a reference position when the user is having difficulty getting the phone to accept a flat surface position.

The drive tutorial screen 420 may also instruct the user that the vehicle should be at a stop position (e.g., in a park mode) before starting the drive mode. The instructions may also include information related to rules of the game and thresholds. For example, the instructions may explain to the user that the user must drive for at least three consecutive minutes in order to receive a drive score, and thus, rewards for advancing in the game. The instructions may also remind the user not to operate the phone while they are driving.

In some instances, the driving tutorial screen 420 may indicate any challenges and/or rewards available in the upcoming drive. For example, the drive tutorial screen 420 may inform the user of a challenge to perform 3 good brake events during the upcoming drive. The drive tutorial screen 420 may also explain that if 3 good brake events are performed consecutively the user may receive a particular reward, such as 10 coins.

As shown in FIG. 4E, the drive tutorial screen 420 may include a start drive mode link 421. In some embodiments, this start drive mode link 421 might only appear once the phone is positioned on a sufficiently flat surface and/or after all instructions have been given to the user. In any event, when the start drive mode link 421 is selected by the user, the driving mode screen 425 may be presented.

The driving mode screen 425 may simply include a stop drive link 426 for the user to press when he/she has completed a drive. While this screen is presented, the safe driver application may collect driving information. This collection may include reading data from the phone's 3 axis accelerometer, the phone's GPS, the vehicle's on-board diagnostic system, and/or the vehicle's GPS. Additionally, the safe driver application may collect other non-driving information, such as audio data (e.g., decibel level of a radio), weather information, traffic information, time of day, information, location information, etc.

In some embodiments, while the safe driver application is in the driving mode, certain functions of the phone may be inoperable. For example, setting the phone in driving mode may cause the phone not to receive/send phone calls, display incoming calls, receive/send messages (e.g., SMS messages), display messages, play music, play video, etc. As such, the safe driver application may function to help the user focus on driving and avoid distractions presented by the phone.

In some cases, the safe driver application may remain in the driving mode until the user presses the stop drive link 426 at which time a drive summary screen 430 may be presented as shown in FIG. 4G. Alternatively, the safe driver application may determine to end the driving mode after a predetermined time (e.g., 30 minutes). By ending the driving mode after a predetermined time, the safe driver application might avoid encouraging a user to continue driving for a long period of time to advance in the game.

Referring to FIG. 4G, a drive summary screen 430 may include information related to the most recent drive, including a score of the most recent drive, a drive time, a number of braking events, a number of turning events, and game rewards earned as a result of the drive. In addition, the drive summary screen may also include an overall driving score so that the user may appreciate how his/her most recent drive compares with his/her overall score. Further, the drive summary screen 430 may include a menu link 431 that, when selected by the user, causes the safe driver application to present the updated menu screen 435 of FIG. 4H. The drive summary screen 430 may also include a drive link 432, like the drive link 418, that, when selected by the user, causes the safe driver application to present the drive tutorial screen 420 of FIG. 4E. Accordingly, the user may perform and receive credit for a number of consecutive drives without having to return to the menu screen 415. Although, in some examples, the safe driver application may impose a limit on the number of consecutive drives that can be performed and credited. In such examples, once the limit is reached, the safe driver application may deactivate the drive link 432 or remove it from the drive summary screen 430 altogether.

FIG. 4H illustrates an updated menu screen 435 corresponding to the menu screen 415 of FIG. 4D. The updated menu screen 435 may include similar objects as those of the menu screen 415. However, some objects may be modified. For example, a first area 436 on the updated menu screen 435, corresponding to the first area 416 of the menu screen 415 in FIG. 4D, may appear brighter (or shaded, in a different color, etc.) than the first area 416 to indicate that a challenge of that area is now available. The particular areas and/or number of areas made available in the updated menu screen 435 may depend on the most recent driving score. Higher driving scores may result in more challenges being available.

In some embodiments, the score may be converted into a distance (or other metric). Certain challenges may be different distances away (and this may be reflected on the updated menu screen 435), and therefore, which challenges may be accessible to a user may depend on the distance achieved. From this distance, a user may appreciate his/her progress in the game and determine how close he/she is to accessing the various areas. If no areas are accessible, the user may select the drive link 437 causing the safe driver application to present the driving tutorial screen 420 of FIG. 4E so that the user may achieve additional driving credit to reach the inaccessible areas.

However, if areas are accessible, the user may select one of the areas by, e.g., pressing on the desired area. In some embodiments, multiple areas may be available to the user, and therefore, each user may receive a different experience as each user may access areas of their choice in the order they choose. Also, in some cases, when a user selects an area, this may cause an object, such as a character, to move to that area to represent the user's selection.

When an area is accessible and selected, the safe driver application may present the challenge tutorial screen 440 of FIG. 4I. The challenge tutorial screen 440 may present a story associated with the challenge. For example, in the "DriveQuest" game, the challenge tutorial screen 440 may feature a knight challenging the user's character to a jousting competition. After the story, the challenge tutorial screen 440 may present instructions for how to perform the challenge (e.g., play the game). In some cases, the challenge tutorial screen 440 may play a clip (or demo) showing the user how to play. Then, when the user selects a play link 441 on the challenge tutorial screen 440, the safe driver application presents a challenge mode screen 445.

FIG. 4J illustrates an example challenge mode screen 445. While this challenge mode screen 445 is presented, the safe driver application may collect user inputs, such as screen presses, screen swipes, operation panel selections, audio inputs, etc. Further, the safe driver application may update the challenge mode screen 445 in response to the user inputs. Updates may include moving objects and/or modifying the color, size, shape, and/or luminosity of the objects.

In the example of FIG. 4J, the user's character is shown riding a horse. The challenge mode screen 445 may present a number of frames to give the illusion that the user's character and horse are moving. Additionally, the challenge mode screen 445 may present targets alongside of the horse as the horse moves. By pressing the screen at points on different sides of the horse and character, the user may control the character to swing a sword to that side. As a result, the user may control the character to swing a sword at the targets. The safe driver application may detect whether the sword hits the targets and may record which or how many targets are hit.

When the challenge ends, a challenge score screen 450 may appear. As shown in FIG. 4K, the challenge score screen may give the user a score based on his/her performance in the challenge. In some cases, the challenge score screen 450 may indicate whether or not the user has completed (e.g., won or lost) the challenge. The challenge score screen 450 may also inform the user of any rewards (e.g., coins, courage points, etc.) received as a result of his/her performance in the challenge. Additionally, the challenge score screen 450 may give the user the option to select a play again link 451 so that the user may access the challenge again. Also, the challenge score screen 450 may include a menu link 452, similar to the menu link 431 described above, that may take the user to an updated menu screen like that shown in FIG. 4H. Therefore, the user may return to the updated menu screen 435 to access challenges not yet complete.

Based on the results of the challenge, the safe driver application may determine that the user has reached a new level. For example, if the user has successfully completed all previously accessible challenges and/or reached a certain drive score and/or status in the game, the safe driver application may determine that the user has advanced to a next level. If so, when the menu link 451 is selected, an advanced menu screen 455 may appear. FIG. 4L illustrates an example of the advanced menu screen 455 for the "DriveQuest" game. As shown in FIG. 4L, the advanced menu screen 455 may include a second level map. The advanced menu screen 455 may include one or more new challenges. Additionally, or alternatively, the difficulty of the challenges available on the advanced menu screen 455 may be increased. Accordingly, as the user progresses in the safe driver application, the user may be presented with increasingly difficult challenges that demand better game performance and/or driving performance.

From the advanced menu screen 455 of FIG. 4L (or the menu screen 415 of FIG. 4D, the updated menu screen 435 of FIG. 4H, or another screen), the user may select a character link 456. The character link 456 may cause the safe driver application 300 to present a character status screen 460 as shown in FIG. 4M. The character status screen 460 may present various information regarding the status of the user's character. For example, the character status screen 460 may indicate the character's health, how many coins the character has collected, how many courage points the character has collected, what items the character owns, what magical items the character has access to, etc. The character status screen 460 may also indicate an overall score associated with the character, which may represent an overall score of the user's performance within the game. In addition to the overall score, the character status screen 460 may also present a driving score representing the user's driving performance.

As shown in FIG. 4M, the character status screen 460 may include a shop link 461. When selected, the shop link 461 may cause the safe driver application 300 to present the shop screen 465 of FIG. 4N. The shop screen 465 may include a list and/or images of items that may be acquired by the character. For example, the user may purchase an item in the shop for the character using coins collected by the character. In the shop screen 465, items that may eventually be available for acquisition by the character, but are not yet available (e.g., because the character has not accumulated enough coins or reached a certain level) may appear darker (or otherwise modified to indicate their unavailability). By showing items that may eventually be accessed, the shop screen 465 may assist in encouraging/motivating the user to continue to play the game, and therefore, continue to improve their driving skills and develop safe driving habits.

FIG. 4M illustrates that the character status screen 460 may also include a leaderboard link 462. When the leaderboard link 462 is selected, the safe driver application 300 may communicate with an application server 205 or a server-side computing device 100a via the network 201 to access a leaderboard. The leaderboard may then be displayed on the leaderboard screen 470 of FIG. 4O. The leaderboard may indicate overall scores and/or driving scores associated with characters of other users playing the game. As a result, a user may receive information pertaining to how well they are doing in the game and/or how well their driving skills are in comparison to others. As such, the leaderboard may foster competition among users. Such competition may assist in encouraging/motivating users to continue to play the game, and therefore, continue to improve their driving skills and develop safe driving habits.

If a user has completed all challenges in all levels, the safe driver application may display a game over screen 475 as shown in FIG. 4P. In some cases, the game over screen 475 may give the user an option to start a new game. As such, the user may play the game again with a different character if the user chooses. Additionally, or alternatively, the game over screen 475 may present the user with a link to download another application, which may be similar to the safe driver application, but designed for more advanced drivers. Still, in some examples, the safe driver application 300 might not have a set number of challenges and/or levels, and therefore, could continue indefinitely as long as game developers add more challenges and levels. Thus, it is conceivable that the safe driver application 300 may continue to supply challenges and levels to users so that users continue to develop their driving skills and drive safely.

Figure 5:
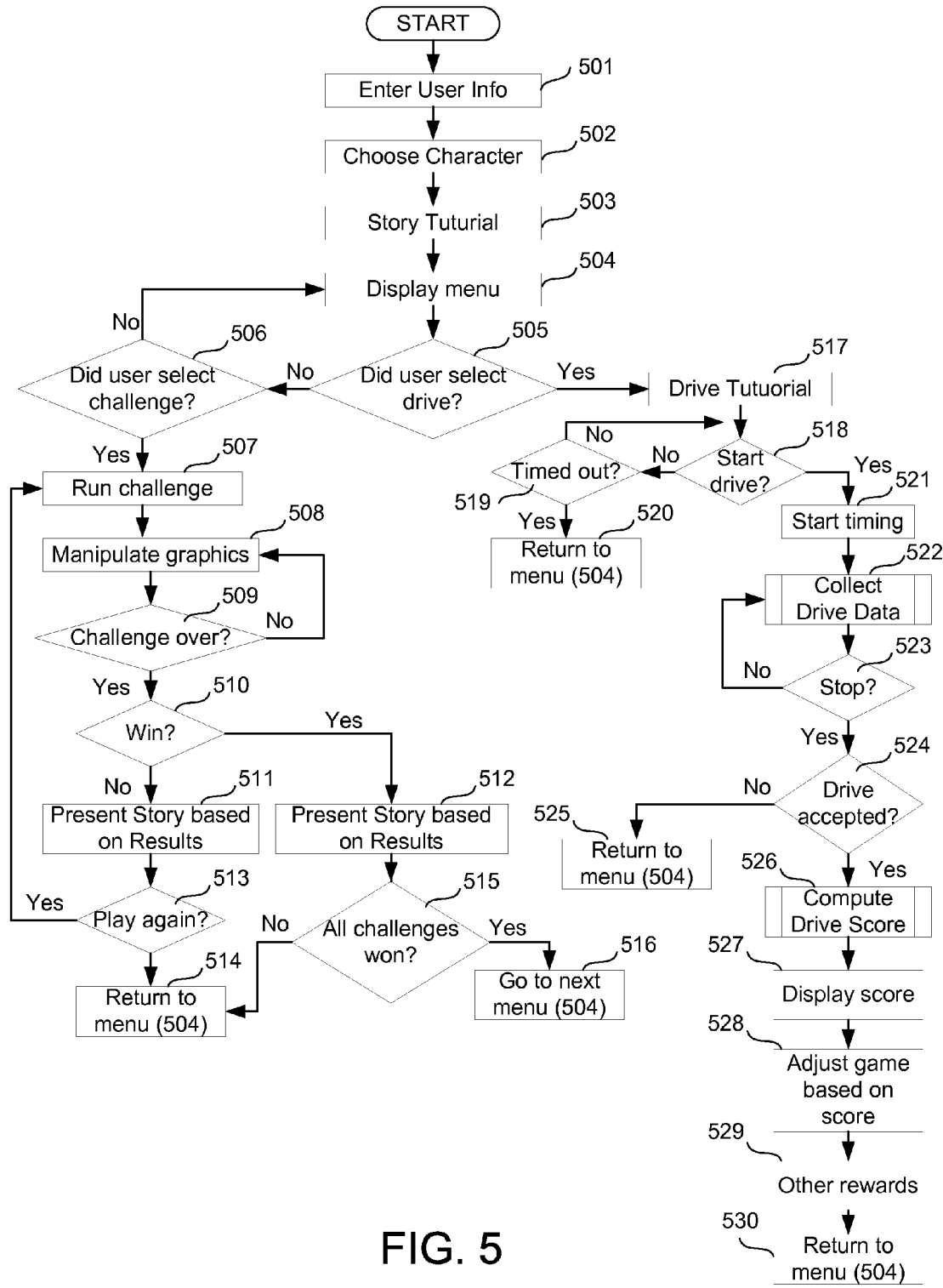
FIG. 5 illustrates a flow diagram of an example process in accordance with aspects of the present disclosure.

FIG. 5 illustrates a flow diagram for an example process in accordance with aspects of the present disclosure. More specifically, FIG. 5 illustrates a plurality of steps a client-side computing device 100b may perform to provide a video game that takes into account a user's driving performance. The steps of FIG. 5 are described below with reference to FIGS. 4A-4P, which illustrate various aspects of the present disclosure. As shown in FIG. 5, the process may begin with step 501 in which a user enters information about themselves. At step 502, the user may choose a character from a listing of characters and/or images of characters. In some embodiments, the user may design his/her own character. The user may choose a name for his/her character at step 502 as well. This character name may be used throughout the safe driver application 300 to give the user a unique/custom user experience. The character name may also be used to identify the user's character on a leaderboard or other page referring to characters of different users.

Step 503 may include an introduction to the game to peak users' interest and to explain the objectives of the game. By giving clues/hints of things to come in the game, the introduction may help to entice users to continue playing the game, and therefore, to continue to improve their driving skills and develop safe driving habits. Step 504 may include presenting a menu screen such as the menu screen 415 of FIG. 4D. In the "DriveQuest" game, the menu screen may include a map of different challenges available on a particular level. The menu screen may be different for different games. For example, in the "TinyTraveler" game, the menu screen may include varying scenes in which the traveler character is variably positioned.

In step 505, the safe driver application 300 may determine whether the user has selected to begin driving. Step 505 may include monitoring user inputs to determine whether the drive link 418 was selected. In some cases, the safe driver application 300 may automatically detect whether the user is driving or about to begin a drive. For example, the safe driver application 300 may monitor communications between the client-side computing device 100b and a vehicle computing device 203 to determine that the user is in a vehicle. Based on this determination, the safe driver application 300 may determine that the user is going to drive.

If the user has not selected to drive (No at step 505), the safe driver application may determine whether a user has selected a challenge at step 506. More specifically, at step 506, the safe driver application may monitor user inputs to determine whether a challenge has been selected. If the safe driver application does not detect the selection of a challenge, the safe driver application may continue to display the menu, and effectively return to step 504.

However, if a challenge selection has been detected at step 506, the safe driver application 300 may run the challenge. Running the challenge at step 507 may include executing a particular challenge module from among the challenge modules 317. The particular challenge module may correspond to the challenge that the user selected, which was detected at step 506. Notably, in some embodiments, different users may select the various challenges in different orders. This flexibility may allow the safe driver application 300 to provide each user with a different user experience. By allowing the user to choose the path his/her character takes (e.g., to choose the order in which challenges are attempted), the safe driver application 300 may increase a user's engagement with the game.

In step 508, the particular challenge module launched at step 507 may collaborate with the user interface module 303, operation panel module 305, and/or audio module 309 to manipulate the graphics presented to the user based on user inputs (e.g., pressing the screen). As a result, the safe driver application 300 may provide a video game experience in which user actions are reflected on the display of the client-side computing device 100b.

Meanwhile, the safe driver application 300 at step 509 may monitor the user inputs and/or results of the particular challenge module to detect whether the challenge is over. After detecting the challenge is over, the safe driver application 300 may determine whether the user has successfully completed the particular challenge at step 510. The requirements for successful completion of each challenge may vary for each challenge. Moreover, the requirements may vary as a factor of the user's performance (e.g., user's overall score, user's driving score, etc.) and/or the level in the game. As such, the safe driver application 300 may manage a degree of difficulty to keep users engaged with the game. For example, the safe driver application 300 may be developed to allow users with lower driving scores to more easily complete challenges so that they remain engaged with the video game and continue to work on their driving skills.

Still referring to step 510, determining whether a challenge has been successfully completed may include comparing results of the challenge with a threshold. For example, where the challenge involves hitting targets in a jousting competition, step 510 may determine whether the number of targets the user hit exceeds a certain threshold.

Based on the results of the determination as to whether the challenge was completed successfully, different stories may be presented. If the challenge was not completed successfully, the safe driver application may present a first storyline at step 511. For example, if the challenge required hitting four targets in a jousting competition and the user hit three (3) or less, the safe driver application 300 may present a story explaining that another knight in the competition hit x+1 targets (where x is the number of targets the user hit, such as 3).

In comparison, if the challenge was completed successfully, the safe driver application may present a second storyline, different than the first storyline, at step 512. For example, if the challenge required hitting four targets in the jousting competition and the user hit four or more, the safe driver application may present a story explaining that the user's character barely beat another knight who hit x−1 (where x is the number of targets the user hit, such as 4). Further, if the challenge was completed successfully, the user may be notified that they have received rewards. The rewards may be in the form of changes to the virtual world (e.g., new objects, modified objects, improved character attributes, new levels, new challenges, etc.), physical rewards (e.g., prizes), and/or cash rewards (e.g., discounts on an insurance policy).

If the challenge was not completed successfully, the user may have the option to play again. The safe driver application 300 may detect whether a user chooses to accept the challenge again at step 513. If the user does accept, the process may return to step 507 to run the particular challenge module again. If the user chooses not to play again at the current time, the user may return to the menu at step 514. Returning to the menu may return the process to step 504 and then step 505 to handle further user inputs. Meanwhile if the challenge was completed successfully, the safe driver application may determine whether all challenges have been completed at step 515. In some embodiments, where multiple levels exist, the determination at step 515 may include determining whether all challenges at the current level have been successfully completed. If the safe driver application determines that more challenges remain (No at 515), the previous menu screen, like the updated menu screen 435 of FIG. 4H, may be shown. In contrast, if all challenges at the current level have been successfully completed (Yes at 515), the safe driver application may present a new menu screen for a new level, like the advanced menu screen 455 of FIG. 4L, in step 516.

Returning to step 505, if the user chooses to drive or the safe driver application detects that the user might drive (Yes at 505), a driving tutorial may be presented at step 517. In step 517, the safe driver application may explain the procedures for using the client-side computing device 100b to record driving characteristics. Via the driving tutorial, the safe driver application 300 may give the user tips/recommendations for driving safely and/or reminders to drive safely (e.g., a reminder to check mirrors and make sure all passengers have buckled their seatbelts).

Further, in some embodiments, presenting a driving tutorial at step 517 may include performing a calibration process. The calibration process may be performed to ensure that the user is configuring/positioning/orienting the client-side computing device 100b properly so that it may subsequently record accurate driving data. Next, step 518 may be performed to detect whether a user has chosen to start a drive. If the user has not selected to start a drive after a certain period of time after presenting the driving tutorial, the safe driver application may decide that the driving tutorial has timed out at step 519 and may return to the menu at step 520.

When a user selects to start a drive (Yes at 518), the safe application may begin timing the drive at step 521. Step 521 may include starting a clock or capturing a timestamp. Then, a subroutine may be performed at step 522 to collect drive data. This subroutine will be described in more detail below.

Meanwhile, the safe driver application 300 may monitor user inputs to determine whether the user has selected to stop the drive at step 523. In some embodiments, the safe driver application may continue to collect drive data so long as the user has not selected a stop link, such as the stop link 426 of FIG. 4F. In other embodiments, the safe driver application may automatically detect the end of a drive. For example, the safe driver application may detect that the client-side computing device 100b has not moved (based on outputs of a 3-axis accelerometer, GPS, or gyroscope of the client-side computing device 100b) for some predetermined period of time, and therefore, may conclude that the user's drive is over. Alternatively, or additionally, the safe driver application may detect that the drive is over based on communications from a vehicle's computing device.

In any event, once the drive is over, the safe driver application 300 may determine whether to accept the drive data. That is, the safe driver application 300 may analyze the validity of the drive data to determine if it reflects a drive. For example, if no turn events were detected and/or no braking events were detected, the safe driver application may determine that the drive data is not accurate. Thus, the safe driver application might not accept a drive unless a certain number of brake events, turn events, and/or other drive events are detected. Also, the safe driver application 300 might not accept a drive that does not exceed a certain amount of time (e.g., 3 minutes). Thus, the safe driver application 300 may prevent, deter, or reduce the likelihood users will fake driving to improve their scores and advance in the video game without relying on their driving skills. If the safe driver application 300 determines not to accept the drive (No at 524), the safe driver application may return to a menu screen (e.g., menu screen 415 of FIG. 4D) without rewarding the user at step 525.

In contrast, if the safe driver application 300 determines to accept the drive (Yes at 524), the safe driver application may perform a subroutine to calculate a drive score based on the collected drive data at step 526. This subroutine will be described in further detail below.

Once the drive score is computed, it may be presented to the user at step 527. Step 527 may include displaying a drive summary screen like that shown in FIG. 4G. In addition to presenting the drive score, the safe driver application 300 may also present some or all of the drive data. Thus, the user may have an opportunity to understand what data was collected. Moreover, the safe driver application 300 may illustrate how the user's score was computed so the user can appreciate how to improve their score during subsequent drives. Still, in some cases, the safe driver application 300 may present tips or indicate driving skills that need improvement so that the user may understand how to improve the user's driving score and/or skills. Also, the safe driver application 300 may present statistics showing the user how his/her driving skills/scores rank against others.

Then, step 528 may be performed to adjust the game. The safe driver application may adjust the game based on the score of the most recent drive and/or a series of scores (or an overall score) of a series of drives when determining what adjustments to make. For example, if an overall driving score has reached 80, the game may be adjusted to reward the driver. Adjustments may also be based on the drive events that took place during the most recent drive and/or based on driving events accumulated in a series of drives. For example, if the driver performed two great turns and/or two great stops, the game may be adjusted to reward the driver. Adjusting the game may include adjusting the status of the character or modifying attributes of the character. For example, the safe driver application may increase/decrease a health, courage, or other feature/attribute of the user's character. Further, adjusting the game may include providing the character with one or more rewards, such as coins, items, and/or magical capabilities. Still, another adjustment may include making one or more previously-inaccessible challenges accessible or providing a new level with a new set of challenges. In light of the above, it should be understood that various adjustments to the game may be made based on the user's driving score. It should also be understood that the number of adjustments and degree of adjustment may also vary depending on the user's driving score. For example, the higher the driving score, the more coins a user may receive. Or, higher driving scores may be reflected by increasing a character's health status. Other factors may contribute to how the game is adjusted as well. For example, in cases where the driving score does not account for driving conditions (e.g., the driving score only accounts for driving performance), the status of the character may be negatively impacted if the user drives at night, in the rain, in heavy traffic (e.g., during rush hour), for too long at one time, etc.

Other rewards may also be provided or recorded for later redemption at step 529. For example, users may earn physical prizes based on their driving performance. In some cases, users may receive monetary rewards or other monetary related rewards (e.g., discounts on an insurance policy). After determining the appropriate adjustment, the safe driver application may return to a menu screen (e.g., menu screen 415 of FIG. 4D) at step 530.

Figure 6:
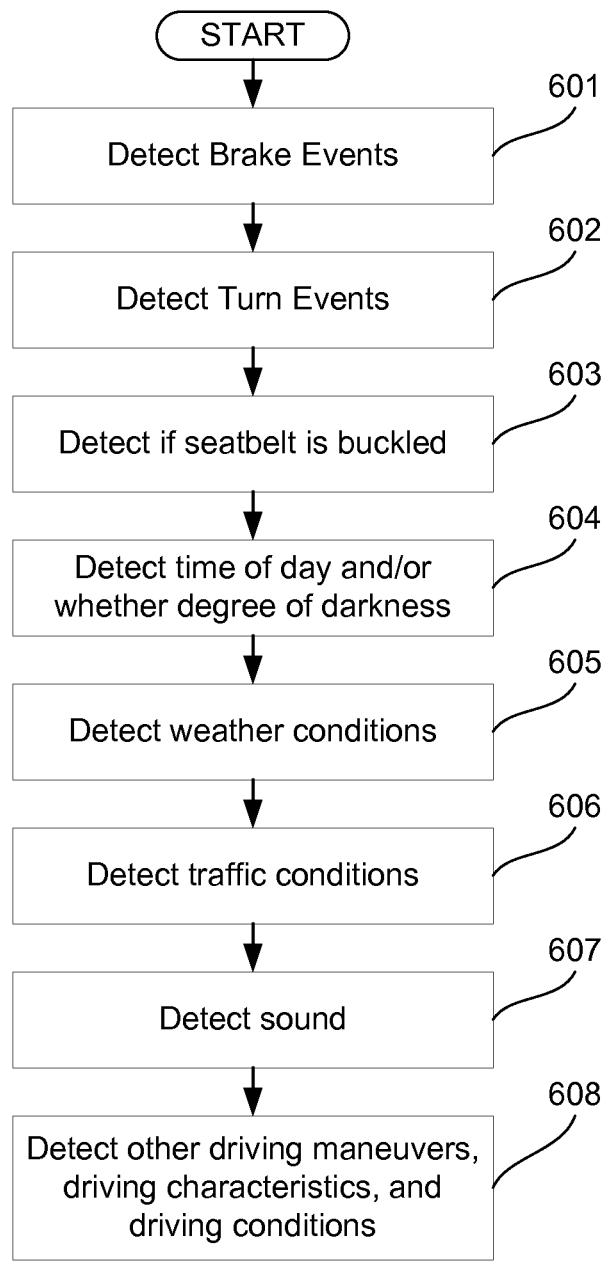
FIG. 6 illustrates a flow diagram of an example process in accordance with aspects of the present disclosure.

FIG. 6 illustrates a flow diagram for an example process in accordance with aspects of the present disclosure. Specifically, FIG. 6 illustrates a process for collecting driving data. The steps of FIG. 6 may be performed by a client-side computing device 100*b* in the subroutine of step 522 of FIG. 5. That is, when the user sets the safe driver application 300 into the driving mode, the safe driver application may collect outputs from certain components within the client-side computing device 100*b* as well as information from a vehicle computing system in which the client-side computing device is located.

In step 601, the safe driver application may detect brake events. To perform this step, the safe driver application may interface with a 3-axis accelerometer, gyroscope, or GPS of a client-side computing device 100*b* and/or a vehicle computing device (including the vehicle's on-board diagnostic system). Based on data received from one or more of these sources, the safe driver application 300 may detect whether a brake event occurred. Specifically, the safe driver application 300 may use one or more algorithms to analyze the data to detect a brake event. For example, braking may be associated with deceleration data, and therefore, by analyzing such data, the safe driver application may determine whether a brake event has occurred. More specifically, a braking event may be detected if deceleration data indicates a threshold change in speed was exceeded (e.g., the vehicle speed decreased by at least 20 mph) and a minimum speed threshold was reached (e.g., the vehicle slowed down to 1 mph). Other algorithms may be used to detect a brake event.

In step 602, the safe driver application 300 may detect turn events. To perform this step, the safe driver application may interface with a 3-axis accelerometer, gyroscope, or GPS of a client-side computing device 100*b* and/or a vehicle computing device (including the vehicle's on-board diagnostic system). Based on data received from one or more of these sources, the safe driver application 300 may detect whether a turn event occurred. Specifically, the safe driver application 300 may use one or more algorithms to analyze the data to detect a turn event. For example, turning may be associated with g-force data, and therefore, by analyzing such data, the safe driver application may determine whether a turn event has occurred. More specifically, a turning event may be detected if the g-force reaches a particular level (e.g., 2 g) and maintains that level for a particular period of time (e.g., 2 seconds). Other algorithms may be used to detect a turn event.

In step 603, the safe driver application 300 may detect whether a user's seatbelt is buckled. This may be detected from the vehicle's computing system (including the vehicle's on-board diagnostic system).

In step 604, the safe driver application 300 may detect the time of day. The time of day may be retrieved from a network source, such as one or more application servers 205, via the network 201 (e.g., an Internet connection), or from a clock on the client-side computing device 100*b* (e.g., the time on a phone). Meanwhile, the safe driver application 300 may also retrieve information regarding the user's (or vehicle's) position and sunrise/sunset times for that position. Such information may be obtained from a network source, such as one or more application servers 205. Using this time of day information, position information, and sunrise/sunset times, the safe driver application 300 may determine whether the user is driving at night.

In step 605, the safe driver application 300 may detect weather conditions that the user may be driving in. The weather conditions may be retrieved from a network source, such as one or more application servers 205, via the network 201 (e.g., an Internet connection), or from another application on the client-side computing device 100*b* or vehicle computing device that already retrieves weather information. The safe driver application may retrieve information regarding the user's (or vehicle's) position, so that it can use this position information for determining the weather information. Thus, the safe driver application may determine whether the user is driving in rain, snow, fog, etc.

In step 606, the safe driver application 300 may detect traffic conditions that the user may be driving in. The traffic conditions may be retrieved from a network source, such as one or more application servers 205, via the network 201 (e.g., an Internet connection), or from another application on the client-side computing device 100*b* or vehicle computing device that already retrieves traffic information. The safe driver application may retrieve information regarding the user's (or vehicle's) position, so that it can use this position information for determining the traffic information. Thus, the safe driver application may determine whether the user is driving in low traffic, medium traffic, heavy traffic, etc.

In step 607, the safe driver application 300 may detect a sound level within the vehicle. For example, the safe driver application may determine whether a radio or other audio output device is producing loud sound that might distract a user from driving. To perform this task, the safe driver application 300 may monitor the microphone of the client-side computing device 100*b*. Alternatively, the safe driver application 300 may communicate with the vehicle's computing system to determine a volume setting of the vehicle's stereo. Notably, the safe driver application may also detect user or passenger generated sound. Thus, if a user or passenger is talking or yelling, the safe driver application may use this information to determine whether the driver may be distracted.

Step 608 illustrates that the safe driver application 300 may detect other driving maneuvers, such as accelerating, decelerating, swerving, changing lanes, parking, tailgating, etc. The safe driver application 300 may also detect other driving characteristics, such as driving speed, a maximum driving speed, a minimum driving speed, constant driving speed, ability to stay in lane, etc. Some driving characteristics may be more subjective. For example, the safe driver application 300 may determine a level of alertness/focus based on a number of factors, such as the position of the driver's head, position or focus of the driver's eyes, setting changes (e.g., changes to the radio, mirrors, temperature, etc.) while driving, etc. In particular, the safe driver application 300 may consider whether the driver used the client-side computing device 100b (e.g., his/her phone) while driving. The safe driver application 300 may detect whether the user answered the phone while driving, placed a call while driving, read a text message while driving, sent a text message while driving, performed an internet search while driving, etc. Moreover, the safe driver application 300 may detect other driving conditions both inside and outside of the driver's vehicle, e.g., number of passengers, distance to other vehicles and/or objects, etc.

Figure 7:
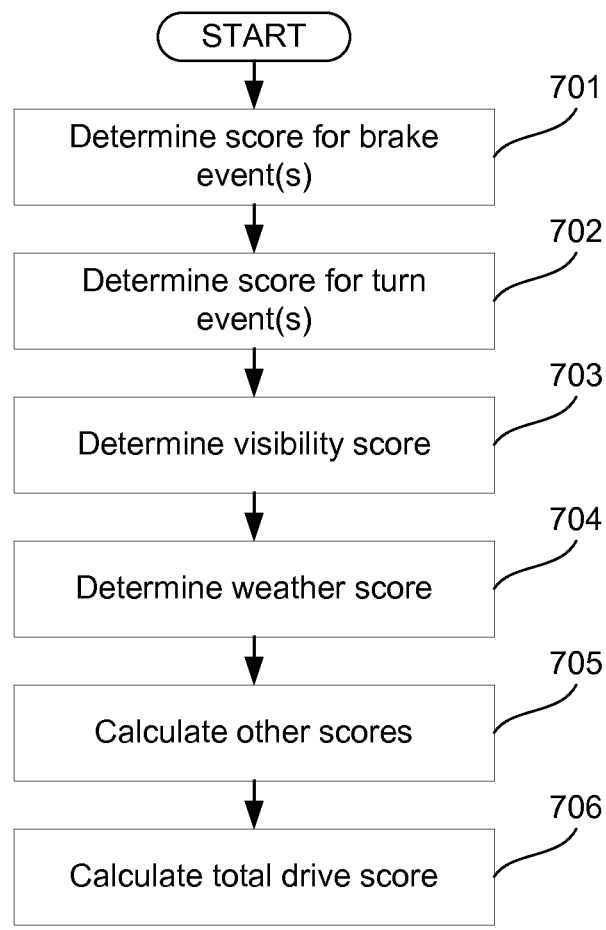
FIG. 7 illustrates a flow diagram of an example process in accordance with aspects of the present disclosure.

FIG. 7 illustrates a flow diagram for an example process in accordance with aspects of the present disclosure. Specifically, FIG. 7 illustrates a process for computing driving scores (an example of driving assessment information) based on driving data. The steps of FIG. 7 may be performed by a client-side computing device 100b in the subroutine of step 526 of FIG. 5. That is, when the user completes a drive, the safe driver application 300 may analyze the collected drive data to calculate (or compute) a drive score for the recently completed drive.

In step 701, the safe driver application 300 may compare data related to the brake events to determine a score for the brake events. Where there are more than one brake event for a single drive, a score may be determined for each brake event and the scores may be averaged (or otherwise combined, e.g., the medium may be taken). Determining a score for a brake event may include analyzing deceleration data during the brake event and comparing the deceleration data against predetermined thresholds. Generally, steady (or smooth) deceleration may be associated with a good brake event. Also, the rate of deceleration may be considered and compared against predetermined thresholds. Generally, lower rates of deceleration (e.g., slow brakes) may be associated with a good brake event. Lower rates of deceleration may indicate that the driver allowed for enough space to complete a brake event given the speed he/she was traveling at. Accordingly, the steadiness and/or rate of deceleration may be evaluated to calculate a score for a brake event.

In some embodiments, the user's level of driving skills/experience may be factored into computing the score for a brake event. Specifically, users with higher levels of driving skill/experience may be required to meet more stringent thresholds to achieve similar scores as users of lower levels of skill/experience. A user's level of driving skills/experience may be based on an overall driving score associated with the user and/or a level (or position) of the user's character within the game. In the latter, users who have reached higher levels in the game may be presumed to have higher levels of driving skills/experience.

In step 702, the safe driver application 300 may compare data related to the turn events to determine a score for the turn events. Where there are more than one turn event for a single drive, a score may be determined for each turn event and the scores may be averaged (or otherwise combined, e.g., the medium may be taken). Determining a score for a turn event may include analyzing g-force data during the turn event and comparing the g-force data against predetermined thresholds. Generally, steady (or smooth) g-force may be associated with a good turn event. Also, the amount of g-force may be considered and compared against predetermined thresholds. Generally, lower rates of g-force may be associated with a good turn event. Lower rates of g-force may indicate that the driver took the turn at an appropriate speed. The safe driver application may also score turn events differently depending on the degree of sharpness. For example, sharper turns (e.g., hard turns) may be weighted more heavily than slight turns. Accordingly, the smoothness of a turn, amount of g-force of a turn, and/or sharpness of a turn may be evaluated to calculate a score for a turn event.

In some embodiments, as described with respect to brake events above, the user's level of driving skills/experience may be factored into computing the score for a turn event. Users with higher levels of driving skill/experience may be expected to perform better turns, and thus, thresholds for scoring turns may be adjusted accordingly.

In step 703, the safe driver application may assign a visibility score based on the time of day a user is driving. Specifically, if the safe driver application 300 determines that the user is driving in the dark, the safe driver application may generate a low visibility score, not give a score at all, or even deduct points from the drive's total score. The visibility score may vary with different degrees of visibility. For example, a visibility score during the middle of the day may be higher than a visibility score at sunset, which may be higher than a visibility score at night. By factoring the time of day and visibility into the user's driving score, the safe driver application may encourage users not to drive at night, when it may be more dangerous, especially for a novice driver.

In step 704, the safe driver application may assign a weather score based on the weather conditions a user is driving in. Specifically, if the safe driver application 300 determines that the user is driving in bad (e.g., more dangerous) weather conditions (e.g., in the rain, snow, fog, etc.), the safe driver application may generate a low weather score, not give a score at all, or even deduct points from the drive's total score. The weather score may vary with different types of weather. For example, a weather score in sunny conditions may be higher than a weather score in cloudy conditions, which may be higher than a weather score in light rain (e.g., drizzle) conditions, which may be higher than a weather score in heavy rain conditions, and so on. By factoring the weather conditions into the user's driving score, the safe driver application may encourage users to avoid driving in poor weather conditions, when it may be more dangerous, especially for a novice driver.

Step 705 illustrates that other scores may be determined as well. Individual scores may be given to any of the driving maneuvers, driving characteristics, and driving conditions detected during the drive. Moreover, any combination of the driving maneuvers, driving characteristics, and driving conditions may be considered to determine various scores. For example, a score for a level of alertness of the driver may be computed based on a score for the driver's eye position/focus and a score for distractions during the drive (e.g., answering a phone call).

In step 706, a total drive score for a drive may be computed/calculated. For example, step 706 may generate the drive score of "72" displayed on the drive summary screen 430 of FIG. 4G. This total drive score may take into account each of the sub-scores determined in steps 701-705 described above. Additionally, the safe driver application may also incorporate other factors and deduct and add points accordingly when computing the total drive score. For example, the safe driver application 300 may deduct points if it determines that a radio was playing music at a volume that could distract a driver. Various algorithms taking into consideration various criteria may be used to compute the total score in step 706. Different criteria may be weighted differently as well. For example, brake events and turn events may contribute more towards the total drive score than other criteria.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method, comprising:
   detecting, by an accelerometer, gyroscope, or global positioning system receiver, acceleration data or location data;
   receiving the acceleration data or the location data at a safe driving software application;
   detecting, by one or more computing devices based on the acceleration data or the location data, a plurality of driving events representing one or more driving maneuvers performed by a user while driving a vehicle in a real-world;
   computing, by the one or more computing devices, a plurality of scores corresponding to the plurality of driving events, respectively, based at least in part on driving standards stored in a memory;
   comparing the plurality of scores to at least one threshold to determine a number of the plurality of driving events having a corresponding score above the at least one threshold; and
   altering a graphically simulated virtual world based on the number of the plurality of driving events having a corresponding score above the at least one threshold, wherein a degree of the altering varies according to the number.

2. The method of claim 1, wherein the computing the plurality of scores comprises taking into account visibility conditions in the real-world.

3. The method of claim 1, further comprising:
   unlocking a portion of the graphically simulated virtual world based on the number of the plurality of driving events having a corresponding score above the at least one threshold.

4. The method of claim 3, further comprising:
   presenting a challenge to the user when a character moves to the unlocked portion of the graphically simulated virtual world.

5. The method of claim 1, further comprising:
   computing a challenge score based on the user's performance during a challenge in the graphically simulated virtual world; and
   modifying the graphically simulated virtual world based on the challenge score, wherein a degree of the modifying varies according to the challenge score.

6. The method of claim 1, wherein the altering comprises:
   modifying a position of a character within the graphically simulated virtual world based on the number, wherein a distance of movement of the character varies according to the number.

7. The method of claim 1, further comprising:
   determining a time of day that the user is driving; and
   modifying a lighting within the graphically simulated virtual world to reflect the time of day.

8. The method of claim 1, further comprising:
   determining weather conditions in which the user is driving; and
   modifying the graphically simulated virtual world to reflect the weather conditions.

9. The method of claim 1, wherein the computing the plurality of scores comprises taking into account weather conditions, comprising at least one of rain, snow, or fog, within the real-world.

10. An apparatus, comprising:
    a network interface configured to communicate with a server of a system comprising a database storing driving standards;
    an accelerometer, gyroscope, or global positioning system receiver configured to obtain acceleration data or location data;
    at least one processor; and
    memory storing computer-executable instructions that, when executed by the at least one processor, cause the apparatus to:
      receive the acceleration data or the location data at a safe driving software application;
      detect, based on the acceleration data or the location data, a plurality of driving events representing one or more driving maneuvers performed by a user while driving a vehicle in a real-world;
      compute a plurality of scores corresponding to the plurality of driving events, respectively, based at least in part on the driving standards;
      compare the plurality of scores to at least one threshold to determine a number of the plurality of driving events having a corresponding score above the at least one threshold; and
      alter a graphically simulated virtual world based on the number of the plurality of driving events having a corresponding score above the at least one threshold, wherein a degree of alteration varies according to the number.

11. The apparatus of claim 10, wherein the plurality of scores are computed taking into account visibility conditions in the real-world.

12. The apparatus of claim 10, wherein said computer-executable instructions further cause the apparatus to:
    unlock a portion of the graphically simulated virtual world based on the number of the plurality of driving events having a corresponding score above the at least one threshold.

13. The apparatus of claim 10, wherein said computer-executable instructions further cause the apparatus to:
    determine a time of day that the user is driving; and
    modify a lighting within the graphically simulated virtual world to reflect the time of day.

14. The apparatus of claim 10, wherein the plurality of scores are computed taking into account weather conditions in the real-world.

15. A system, comprising:
    a vehicle;
    an accelerometer, gyroscope, or global positioning system receiver configured to obtain acceleration data or location data;
    a database storing driving standards; and
    one or more computing devices configured to:
      receive the acceleration data or the location data;
      detect, based on the acceleration data or the location data, a plurality of driving events representing one or more driving maneuvers performed by a user while driving the vehicle in a real-world;

determine a plurality of scores corresponding to the plurality of driving events, respectively, based at least in part on the driving standards;

compare the plurality of scores to at least one threshold to determine a number of the plurality of driving events having a corresponding score above the at least one threshold; and alter a graphically simulated virtual world based on the number of the plurality of driving events having a corresponding score above the at least one threshold, wherein a degree of alteration varies according to the number.

16. The system of claim 15, wherein the alteration comprises moving a character within the graphically simulated virtual world by a distance that varies according to the number.

17. The system of claim 15, wherein the one or more computing devices are further configured to alter the graphically simulated virtual world based on the user's performance during a challenge within the graphically simulated virtual world.

18. The system of claim 15, wherein a driving skill level of the user is a factor in determining the plurality of scores, wherein users with higher driving skill levels are held to higher standards than users with lower driving skill levels.

19. The system of claim 15, wherein the plurality of driving events comprises at least one braking event or at least one turning event.

20. The system of claim 15, wherein the alteration comprises providing a particular number of objects, points, or coins that are used within the graphically simulated virtual world in a case in which the one or more computing devices determine that the user performed a particular number of braking events or turning events having a score above the at least one threshold.

* * * * *